(12) United States Patent
Platner et al.

(10) Patent No.: US 12,554,182 B2
(45) Date of Patent: Feb. 17, 2026

(54) REPLACEABLE LENS MODULE HAVING A MOVABLE HOUSING FOR IMPACT FORCE TRANSFER

(71) Applicant: GoPro, Inc., San Mateo, CA (US)

(72) Inventors: David Thomas Platner, San Francisco, CA (US); Ian Copeland Griggs, San Francisco, CA (US); Jonathan Stern, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 151 days.

(21) Appl. No.: 18/235,037

(22) Filed: Aug. 17, 2023

(65) Prior Publication Data

US 2025/0060654 A1 Feb. 20, 2025

(51) Int. Cl.
  *G03B 17/14* (2021.01)
  *G02B 7/14* (2021.01)
  *G03B 17/08* (2021.01)

(52) U.S. Cl.
  CPC .............. *G03B 17/14* (2013.01); *G02B 7/14* (2013.01); *G03B 17/08* (2013.01)

(58) Field of Classification Search
  CPC ........... G03B 17/14; G03B 17/08; G02B 7/14
  USPC ....................................................... 348/373
  See application file for complete search history.

(56) References Cited

U.S. PATENT DOCUMENTS

| 9,477,064 | B1 | 10/2016 | Chen |
| 9,609,195 | B2* | 3/2017 | Czepowicz ............ H04N 23/54 |
| 10,701,249 | B1 | 6/2020 | Guo |
| 10,969,660 | B2 | 4/2021 | Cotoros |
| 11,425,286 | B2 | 8/2022 | Vitale |
| 11,606,488 | B2 | 3/2023 | Vitale |
| 11,647,270 | B2 | 5/2023 | Vitale |
| 2002/0130963 | A1 | 9/2002 | Gelbard |
| 2005/0030410 | A1* | 2/2005 | Tsukatani ............... G03B 17/14 348/360 |
| 2005/0099520 | A1* | 5/2005 | Cheng .................... H04N 23/55 348/335 |
| 2007/0133977 | A1 | 6/2007 | Mayumi |

(Continued)

FOREIGN PATENT DOCUMENTS

| CN | 216595712 U | 5/2022 |
| KR | 100733047 B1 | 9/2006 |

(Continued)

OTHER PUBLICATIONS

International Search Report for Application No. PCT/US2019/058061, dated Jan. 30, 2020, 9 pages.

*Primary Examiner* — Usman A Khan
(74) *Attorney, Agent, or Firm* — Young Basile Hanlon & MacFarlane, P.C.

(57) ABSTRACT

An image capture device includes a lens barrel disposed in a body of the image device, a bayonet, a replaceable lens module that is configured to releasably couple to the bayonet, and a biasing element coupled to the housing or coupled to the bayonet that is configured to bias the housing against the lens barrel. The replaceable lens module includes a housing and a lens positioned in a lens recess of the housing. Additionally, when an impact force that meets a predetermined threshold is applied to an exterior surface of the replaceable lens module, the housing is configured to compress the biasing element and disengage the lens barrel.

20 Claims, 11 Drawing Sheets

(56) References Cited

U.S. PATENT DOCUMENTS

| | | |
|---|---|---|
| 2009/0147377 A1* | 6/2009 | Polyakov ............... G03B 3/10 359/694 |
| 2010/0165188 A1 | 7/2010 | Jannard |
| 2013/0111464 A1 | 5/2013 | Markas |
| 2013/0128104 A1 | 5/2013 | Nunnink |
| 2013/0129335 A1 | 5/2013 | Gainer |
| 2013/0182179 A1 | 7/2013 | Page |
| 2013/0343735 A1 | 12/2013 | Zhang |
| 2014/0072293 A1* | 3/2014 | Ono ..................... G03B 17/14 396/532 |
| 2014/0098225 A1 | 4/2014 | Rodriguez |
| 2014/0160304 A1 | 6/2014 | Galor |
| 2015/0293430 A1 | 10/2015 | O'Neill |
| 2016/0174408 A1 | 6/2016 | Tolbert |
| 2016/0274338 A1 | 9/2016 | Davies |
| 2016/0349601 A1 | 12/2016 | Kungl |
| 2017/0062303 A1 | 3/2017 | Lee |
| 2017/0064159 A1 | 3/2017 | Lee |
| 2017/0102513 A1 | 4/2017 | Ogata |
| 2017/0111559 A1 | 4/2017 | Abbas |
| 2017/0223239 A1 | 8/2017 | Petty |
| 2018/0088443 A1* | 3/2018 | Riddiford ............. G03B 11/06 |
| 2018/0143514 A1 | 5/2018 | Campbell |
| 2018/0224717 A1 | 8/2018 | Matsuzawa |
| 2019/0278045 A1* | 9/2019 | Manushi ............... G02B 7/021 |
| 2020/0096783 A1* | 3/2020 | Togawa ................ G03B 17/14 |
| 2020/0133095 A1 | 4/2020 | Cotoros |
| 2021/0255525 A1 | 8/2021 | Cotoros |
| 2022/0353400 A1 | 11/2022 | Vitale |
| 2022/0400192 A1 | 12/2022 | Vitale |
| 2022/0400196 A1 | 12/2022 | Vitale |
| 2023/0209166 A1 | 6/2023 | Vitale |

FOREIGN PATENT DOCUMENTS

| | | |
|---|---|---|
| KR | 20160015880 A | 2/2016 |
| WO | 2013058469 A1 | 4/2013 |

* cited by examiner

REPLACEABLE LENS MODULE HAVING A MOVABLE HOUSING FOR IMPACT FORCE TRANSFER

TECHNICAL FIELD

This disclosure relates to an optical system, and more specifically, to an image capture device that includes a replaceable lens module.

BACKGROUND

Typical cameras may include one or more lenses so that images may be taken through the lenses (e.g., using one or more image sensors). The lenses may be connected within an image capture device so that alignment of the lenses is maintained. The lenses may be connected to a frame or to each other so that proper alignment is achieved and maintained. However, the lenses may become misaligned when the image capture device is dropped or impacted, thereby rendering the image capture device unable to capture images clearly or accurately. Additionally, if the lenses become damaged, it may be difficult to replace the lenses individually and may require replacement of the entire image capture device.

SUMMARY

In one implementation, an image capture device includes a lens barrel, bayonet, a replaceable lens module, and a biasing element. The lens barrel is disposed in a body of the image capture device. The replaceable lens module is configured to releasable couple to the bayonet. Additionally, the replaceable lens module includes a housing and a lens positioned in a lens recess of the housing. The biasing element is coupled to the housing or coupled to the bayonet and is configured to bias the housing against the lens barrel. When an impact force that meets a predetermined threshold is applied to an exterior surface of the replaceable lens module, the housing is configured to compress the biasing element and disengage the lens barrel.

In certain implementations, when the impact force that meets the predetermined threshold is applied to the exterior surface of the replaceable lens module, the housing may be configured to move outward and inward with respect to the body of the image capture device in a direction substantially parallel to an optical axis of the lens barrel. Additionally, when the impact force that meets the predetermined threshold is applied to the exterior surface of the replaceable lens module, the housing may be configured to move towards the body of the image capture device until the housing contacts a travel stop located on the body of the image capture device.

In certain implementations, the housing may include an axial portion that extends substantially parallel to an optical axis of the lens barrel and a projection that extends radially inward from the axial portion towards the optical axis to releasably couple the replaceable lens module to the bayonet. The bayonet may be coupled to the lens barrel and may include a finger that extend radially outward from the optical axis, whereby the projection of the housing may be configured to engage the finger of the bayonet. Additionally, the projection and the finger of the bayonet may be complementary in shape. Furthermore, the biasing element may be configured to exert a biasing force on the housing to retain contact between an engaging surface of the projection and a mounting surface of the finger of the bayonet.

In certain implementations, the biasing element may be located between the housing and the body. Additionally, the replaceable lens module may include a cap coupled to the housing and configured to couple to the body of the image capture device. The replaceable lens module may be movable along and about an optical axis of the lens barrel to couple the replaceable lens module to the bayonet. The replaceable lens module may be configured to axially align the lens of the replaceable lens module and the lens barrel of the image capture device.

In another implementation, a replaceable lens module for an image capture device includes a housing, a lens disposed in a lens recess of the housing, and a biasing element. The housing is configured to removably couple the replaceable lens module to a bayonet of the image capture device. The lens is configured to axially align with a lens barrel disposed in a body of the image capture device. Additionally, the biasing element is coupled to the housing and configured to bias an engaging surface of the housing against a mounting surface of the lens barrel. When an external force that meets a predetermined threshold is applied to the replaceable lens module, the engaging surface of the housing is configured to separate from the mounting surface of the lens barrel so that the housing is free of contact with the lens barrel and the external force is transmitted through the housing and away from the lens barrel.

In certain implementations, the housing may include an axial portion that extends substantially parallel to an optical axis of the lens barrel and a first projection that extends radially inward from the axial portion towards the optical axis, whereby the engaging surface of the housing may be located on the first projection. The housing may also include a second projection that extends radially outward from the axial portion away from the optical axis. The second projection may be configured to contact the body of the image capture device when the engaging surface of the housing separates from the mounting surface of the lens barrel to transmit the external force through the housing and away from the lens barrel. Additionally, the first projection may be configured to be free of contact with both the lens barrel and the body of the image capture device when the second projection contacts the body of the image capture device.

In certain implementations, the housing may be configured to move outward and inward with respect to the image capture device in a direction substantially parallel to an optical axis of the lens barrel to separate the engaging surface of the housing from the mounting surface of the lens barrel. The engaging surface of the housing may be configured to be substantially flush to the mounting surface of the lens barrel when the engaging surface is biased against the mounting surface.

In another implementation, an image capture device includes a lens barrel disposed in a body of the image capture device, a bayonet coupled to the lens barrel or coupled to the body of the image capture device, and a replaceable lens module. The lens barrel includes one or more internal lenses disposed in the lens barrel. Additionally, the replaceable lens module includes a housing configured to move axially with respect to the lens barrel between an engaged position, in which the housing is biased against the lens barrel, and an impact position, in which the housing is free of contact with the lens barrel. The replaceable lens module also includes a lens coupled to the housing that is configured to axially align with one or more internal lenses of the lens barrel that are disposed in the lens barrel.

Moreover, the image capture device includes a first seal that is compressible between the housing and the body of the image capture device.

In certain implementations, the replaceable lens module may include a cap coupled to the housing and configured to at least partially conceal the housing from view from a position exterior to the image capture device, whereby the cap may be configured to couple to the body of the image capture device. Additionally, the image capture device may include a second seal compressible between the cap and the body of the image capture device.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

A replaceable lens module and/or an external lens are configured to connect to an image capture device. The image capture device may include one or more lenses that are fixed within the image capture device (e.g., internal lenses integrated with, or coupled to, a lens barrel of the image capture device) and one or more lenses that are removable and/or interchangeable (e.g., an external lens of the replaceable lens module). The replaceable lens module may be located in front of, or external to, the lenses that are fixed within the image capture device. The replaceable lens module, the external lens, or both may be removed from the image capture device for replacement or change, and then recoupled to the image capture device. The replaceable lens module, the external lens, or both may be completely or partially sealed with respect to the image capture device.

In order for images or videos to be captured, the external lens and the internal lenses are aligned along an optical axis. The external lens and the internal lenses may be subject to build tolerances that, if not followed, could cause misalignment and negatively impact capture of the images or videos. Additionally, if the image capture device is accidentally dropped or impacted, the external lens may be damaged or may become misaligned with the internal lenses, thereby negatively impacting the capture of the images or the videos. Similarly, if the image capture device is dropped or impacted, portions of the image capture device other than the external lens (e.g., the internal lenses, the lens barrel, etc.) may also be damaged, thereby potentially requiring replacement of the entire image capture device.

A replaceable lens module is described that achieves and/or maintains proper alignment between the internal lenses and the external lens so that the images or videos captured are clear and complete without distortion. Furthermore, the the replaceable lens module facilitates easy replacement or changing of the external lens (e.g., to replace a damaged external lens, to interchange the external lens with another type of external lens, etc.) while still ensuring proper alignment between the external lens and the internal lenses. Additionally, the replaceable lens module movably couples to the image capture device to transfer an impact force through the replaceable lens module and into a housing of the image capture device, thereby directing the impact force away from the lens barrel and internal lenses and preventing damage to the lens barrel and the internal lenses.

Figure 1A:
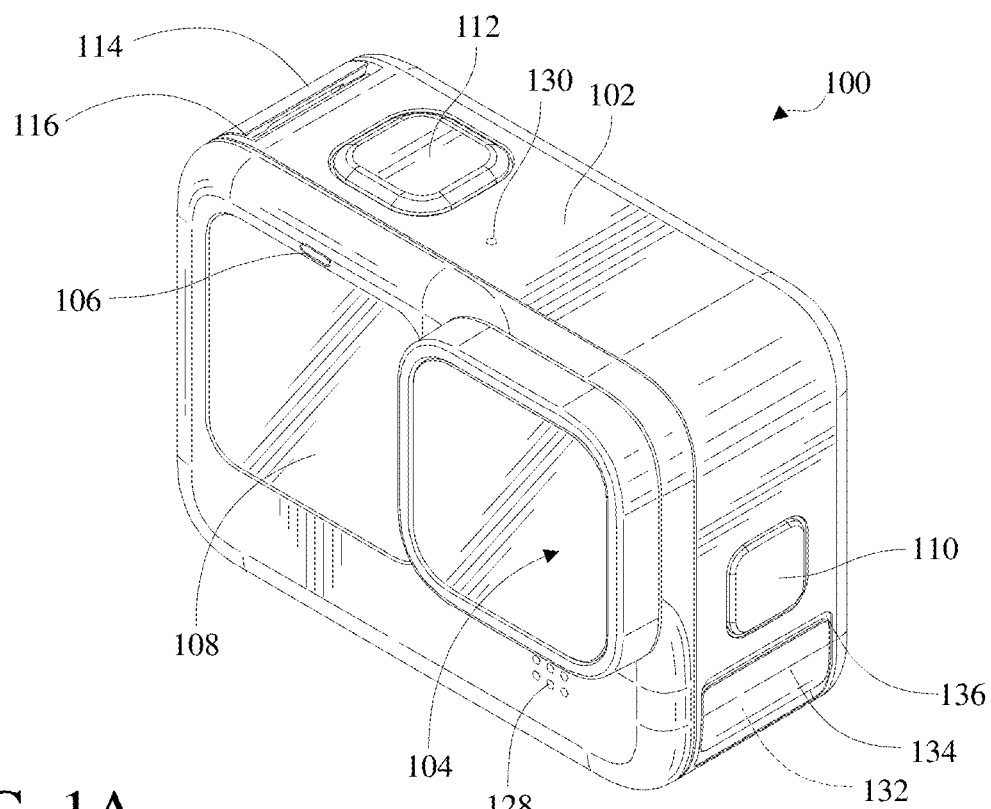
FIGS. 1A-1B are isometric views of an example of an image capture apparatus.
Figure 1B:
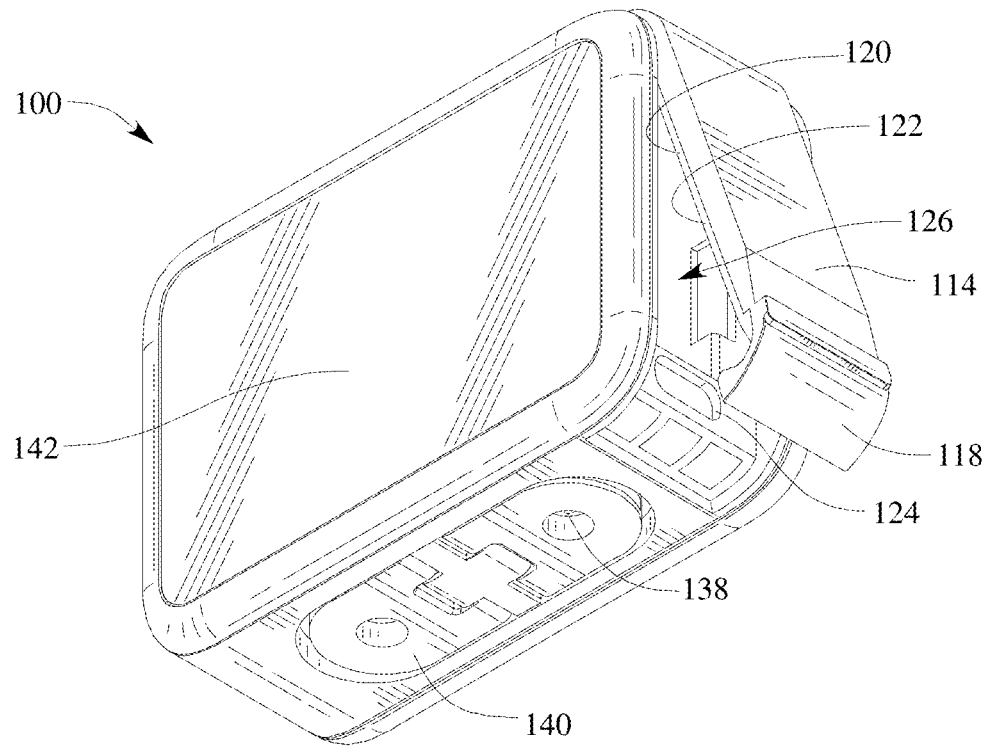
Figure 5:
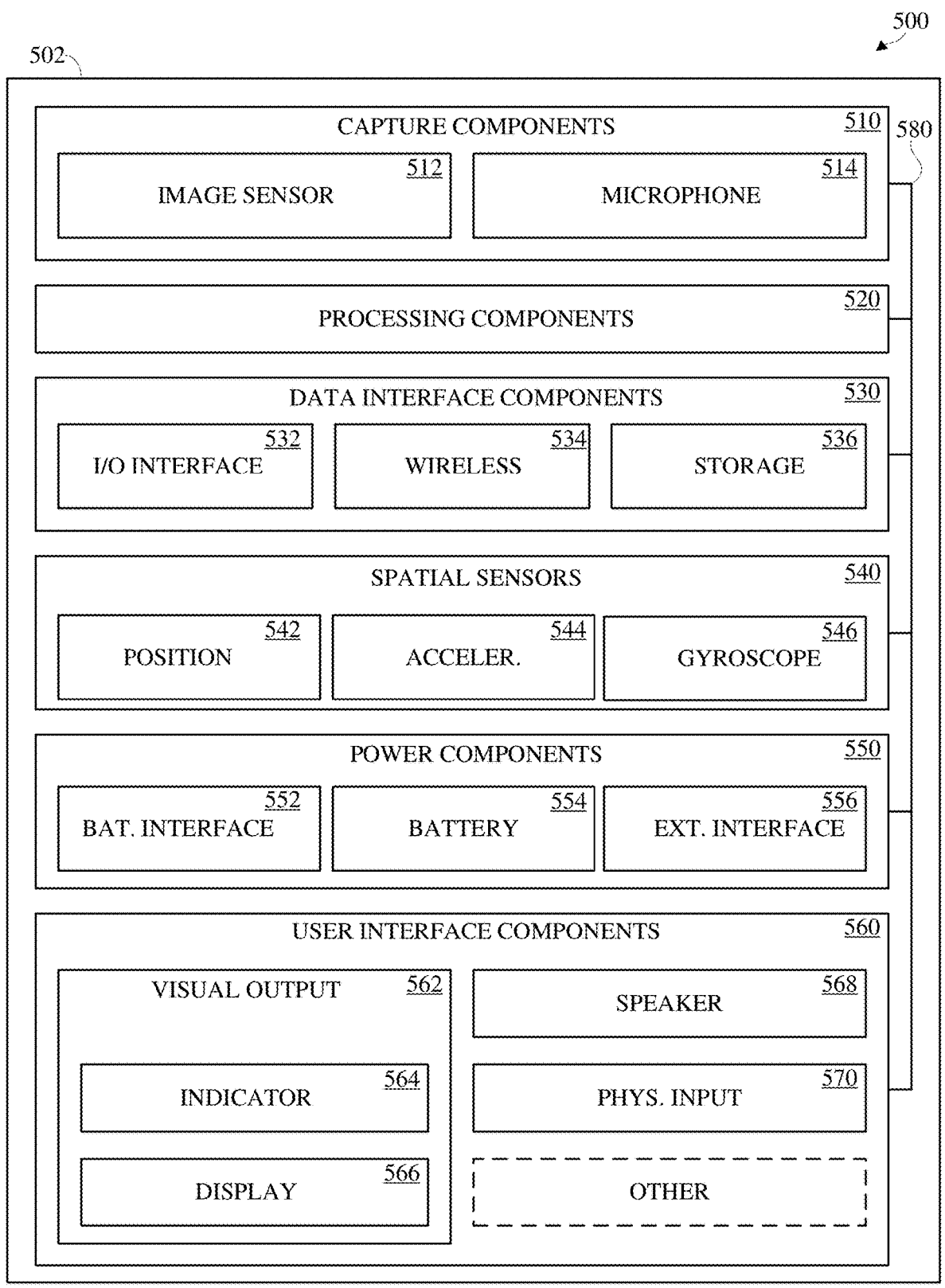
FIG. 5 is a block diagram of electronic components of an image capture apparatus.

FIGS. 1A-1B are isometric views of an example of an image capture apparatus 100. The image capture apparatus 100 includes a body 102, an image capture device 104, an indicator 106, a display 108, a mode button 110, a shutter button 112, a door 114, a hinge mechanism 116, a latch mechanism 118, a seal 120, a battery interface 122, a data interface 124, a battery receptacle 126, microphones 128, 130, 132, a speaker 138, an interconnect mechanism 140, and a display 142. Although not expressly shown in FIGS. 1A-1B, the image capture apparatus 100 includes internal electronics, such as imaging electronics, power electronics, and the like, internal to the body 102 for capturing images and performing other functions of the image capture apparatus 100. An example showing internal electronics is shown in FIG. 5. The arrangement of the components of the image capture apparatus 100 shown in FIGS. 1A-1B is an example, other arrangements of elements may be used, except as is described herein or as is otherwise clear from context.

The body 102 of the image capture apparatus 100 may be made of a rigid material such as plastic, aluminum, steel, or fiberglass. Other materials may be used. The image capture device 104 is structured on a front surface of, and within, the body 102. The image capture device 104 includes a lens. The lens of the image capture device 104 receives light incident upon the lens of the image capture device 104 and directs the received light onto an image sensor of the image capture device 104 internal to the body 102. The image capture apparatus 100 may capture one or more images, such as a sequence of images, such as video. The image capture apparatus 100 may store the captured images and video for subsequent display, playback, or transfer to an external device. Although one image capture device 104 is shown in FIG. 1A, the image capture apparatus 100 may include multiple image capture devices, which may be structured on respective surfaces of the body 102.

As shown in FIG. 1A, the image capture apparatus 100 includes the indicator 106 structured on the front surface of the body 102. The indicator 106 may output, or emit, visible light, such as to indicate a status of the image capture apparatus 100. For example, the indicator 106 may be a light-emitting diode (LED). Although one indicator 106 is shown in FIG. 1A, the image capture apparatus 100 may include multiple indictors structured on respective surfaces of the body 102.

As shown in FIG. 1A, the image capture apparatus 100 includes the display 108 structured on the front surface of the body 102. The display 108 outputs, such as presents or displays, such as by emitting visible light, information, such as to show image information such as image previews, live video capture, or status information such as battery life, camera mode, elapsed time, and the like. In some implementations, the display 108 may be an interactive display, which may receive, detect, or capture input, such as user input representing user interaction with the image capture apparatus 100. In some implementations, the display 108 may be omitted or combined with another component of the image capture apparatus 100.

As shown in FIG. 1A, the image capture apparatus 100 includes the mode button 110 structured on a side surface of the body 102. Although described as a button, the mode button 110 may be another type of input device, such as a switch, a toggle, a slider, or a dial. Although one mode button 110 is shown in FIG. 1A, the image capture apparatus 100 may include multiple mode, or configuration, buttons structured on respective surfaces of the body 102. In some implementations, the mode button 110 may be omitted or combined with another component of the image capture apparatus 100. For example, the display 108 may be an interactive, such as touchscreen, display, and the mode button 110 may be physically omitted and functionally combined with the display 108.

As shown in FIG. 1A, the image capture apparatus 100 includes the shutter button 112 structured on a top surface of the body 102. The shutter button 112 may be another type of input device, such as a switch, a toggle, a slider, or a dial. The image capture apparatus 100 may include multiple shutter buttons structured on respective surfaces of the body 102. In some implementations, the shutter button 112 may be omitted or combined with another component of the image capture apparatus 100.

The mode button 110, the shutter button 112, or both, obtain input data, such as user input data in accordance with user interaction with the image capture apparatus 100. For example, the mode button 110, the shutter button 112, or both, may be used to turn the image capture apparatus 100 on and off, scroll through modes and settings, and select modes and change settings.

As shown in FIG. 1B, the image capture apparatus 100 includes the door 114 coupled to the body 102, such as using the hinge mechanism 116 (FIG. 1A). The door 114 may be secured to the body 102 using the latch mechanism 118 that releasably engages the body 102 at a position generally opposite the hinge mechanism 116. The door 114 includes the seal 120 and the battery interface 122. Although one door 114 is shown in FIG. 1A, the image capture apparatus 100 may include multiple doors respectively forming respective surfaces of the body 102, or portions thereof. The door 114 may be removable from the body 102 by releasing the latch mechanism 118 from the body 102 and decoupling the hinge mechanism 116 from the body 102.

In FIG. 1B, the door 114 is shown in a partially open position such that the data interface 124 is accessible for communicating with external devices and the battery receptacle 126 is accessible for placement or replacement of a battery. In FIG. 1A, the door 114 is shown in a closed position. In implementations in which the door 114 is in the closed position, the seal 120 engages a flange (not shown) to provide an environmental seal and the battery interface 122 engages the battery (not shown) to secure the battery in the battery receptacle 126.

As shown in FIG. 1B, the image capture apparatus 100 includes the battery receptacle 126 structured to form a portion of an interior surface of the body 102. The battery receptacle 126 includes operative connections for power transfer between the battery and the image capture apparatus 100. In some implementations, the battery receptacle 126 may be omitted. The image capture apparatus 100 may include multiple battery receptacles.

As shown in FIG. 1A, the image capture apparatus 100 includes a first microphone 128 structured on a front surface of the body 102, a second microphone 130 structured on a top surface of the body 102, and a third microphone 132 structured on a side surface of the body 102. The third microphone 132, which may be referred to as a drain microphone and is indicated as hidden in dotted line, is located behind a drain cover 134, surrounded by a drain channel 136, and can drain liquid from audio components of the image capture apparatus 100. The image capture apparatus 100 may include other microphones on other surfaces of the body 102. The microphones 128, 130, 132 receive and record audio, such as in conjunction with capturing video or separate from capturing video. In some implementations, one or more of the microphones 128, 130, 132 may be omitted or combined with other components of the image capture apparatus 100.

As shown in FIG. 1B, the image capture apparatus 100 includes the speaker 138 structured on a bottom surface of the body 102. The speaker 138 outputs or presents audio, such as by playing back recorded audio or emitting sounds associated with notifications. The image capture apparatus 100 may include multiple speakers structured on respective surfaces of the body 102.

As shown in FIG. 1B, the image capture apparatus 100 includes the interconnect mechanism 140 structured on a bottom surface of the body 102. The interconnect mechanism 140 removably connects the image capture apparatus 100 to an external structure, such as a handle grip, another mount, or a securing device. The interconnect mechanism 140 includes folding protrusions configured to move between a nested or collapsed position as shown in FIG. 1B and an extended or open position. The folding protrusions of the interconnect mechanism 140 in the extended or open position may be coupled to reciprocal protrusions of other devices such as handle grips, mounts, clips, or like devices. The image capture apparatus 100 may include multiple interconnect mechanisms structured on, or forming a portion of, respective surfaces of the body 102. In some implementations, the interconnect mechanism 140 may be omitted.

As shown in FIG. 1B, the image capture apparatus 100 includes the display 142 structured on, and forming a portion of, a rear surface of the body 102. The display 142 outputs, such as presents or displays, such as by emitting visible light, data, such as to show image information such as image previews, live video capture, or status information such as battery life, camera mode, elapsed time, and the like. In some implementations, the display 142 may be an interactive display, which may receive, detect, or capture input, such as user input representing user interaction with the image capture apparatus 100. The image capture apparatus 100 may include multiple displays structured on respective surfaces of the body 102, such as the displays 108, 142 shown in FIGS. 1A-1B. In some implementations, the display 142 may be omitted or combined with another component of the image capture apparatus 100.

The image capture apparatus 100 may include features or components other than those described herein, such as other buttons or interface features. In some implementations, interchangeable lenses, cold shoes, and hot shoes, or a combination thereof, may be coupled to or combined with the image capture apparatus 100. For example, the image capture apparatus 100 may communicate with an external device, such as an external user interface device, via a wired or wireless computing communication link, such as via the data interface 124. The computing communication link may be a direct computing communication link or an indirect computing communication link, such as a link including another device or a network, such as the Internet. The image capture apparatus 100 may transmit images to the external device via the computing communication link.

The external device may store, process, display, or combination thereof, the images. The external user interface device may be a computing device, such as a smartphone, a tablet computer, a smart watch, a portable computer, personal computing device, or another device or combination of devices configured to receive user input, communicate information with the image capture apparatus 100 via the computing communication link, or receive user input and communicate information with the image capture apparatus 100 via the computing communication link. The external user interface device may implement or execute one or more applications to manage or control the image capture apparatus 100. For example, the external user interface device may include an application for controlling camera configuration, video acquisition, video display, or any other configurable or controllable aspect of the image capture apparatus 100. In some implementations, the external user interface device may generate and share, such as via a cloud-based or social media service, one or more images or video clips. In some implementations, the external user interface device may display unprocessed or minimally processed images or video captured by the image capture apparatus 100 contemporaneously with capturing the images or video by the image capture apparatus 100, such as for shot framing or live preview.

Figure 2A:
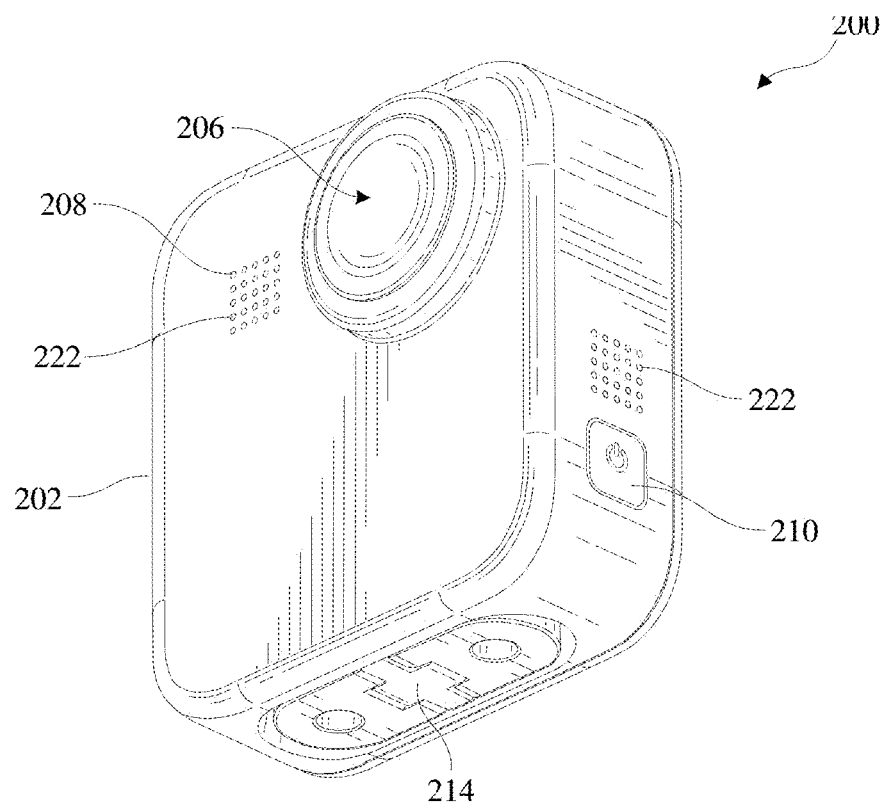
FIGS. 2A-2B are isometric views of another example of an image capture apparatus.
Figure 2B:
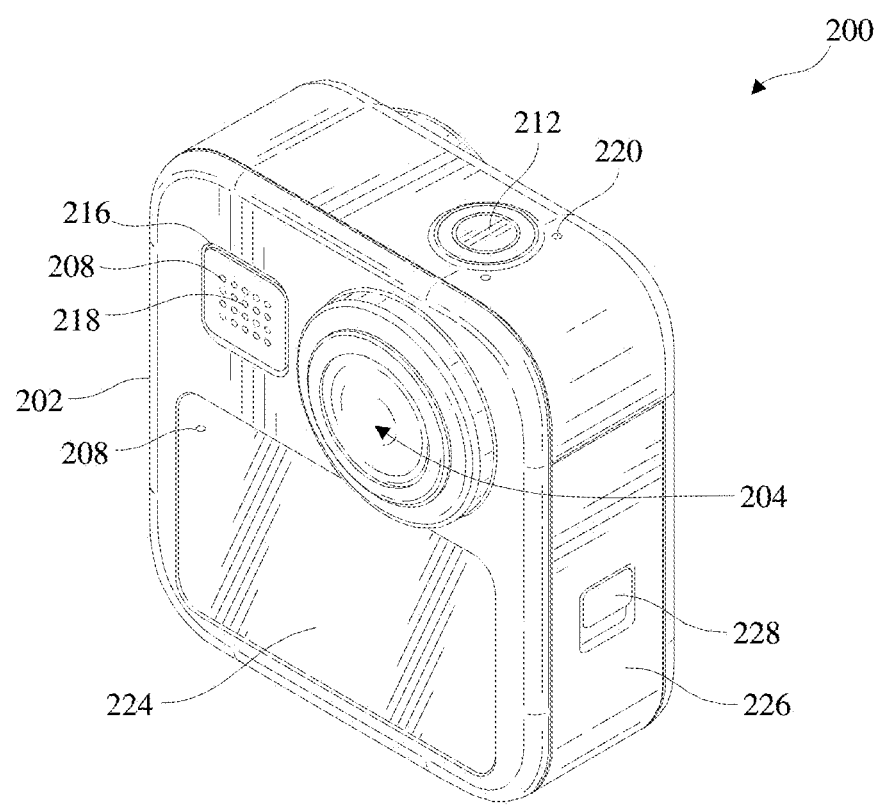

FIGS. 2A-2B illustrate another example of an image capture apparatus 200. The image capture apparatus 200 is similar to the image capture apparatus 100 shown in FIGS. 1A-1B. The image capture apparatus 200 includes a body 202, a first image capture device 204, a second image capture device 206, indicators 208, a mode button 210, a shutter button 212, an interconnect mechanism 214, a drainage channel 216, audio components 218, 220, 222, a display 224, and a door 226 including a release mechanism 228. The arrangement of the components of the image capture apparatus 200 shown in FIGS. 2A-2B is an example, other arrangements of elements may be used.

The body 202 of the image capture apparatus 200 may be similar to the body 102 shown in FIGS. 1A-1B. The first image capture device 204 is structured on a front surface of the body 202. The first image capture device 204 includes a first lens. The first image capture device 204 may be similar to the image capture device 104 shown in FIG. 1A. As shown in FIG. 2A, the image capture apparatus 200 includes the second image capture device 206 structured on a rear surface of the body 202. The second image capture device 206 includes a second lens. The second image capture device 206 may be similar to the image capture device 104 shown in FIG. 1A. The image capture devices 204, 206 are disposed on opposing surfaces of the body 202, for example, in a back-to-back configuration, Janus configuration, or offset Janus configuration. The image capture apparatus 200 may include other image capture devices structured on respective surfaces of the body 202.

As shown in FIG. 2B, the image capture apparatus 200 includes the indicators 208 associated with the audio component 218 and the display 224 on the front surface of the body 202. The indicators 208 may be similar to the indicator 106 shown in FIG. 1A. For example, one of the indicators 208 may indicate a status of the first image capture device 204 and another one of the indicators 208 may indicate a status of the second image capture device 206. Although two indicators 208 are shown in FIGS. 2A-2B, the image capture apparatus 200 may include other indictors structured on respective surfaces of the body 202.

As shown in FIGS. 2A-2B, the image capture apparatus 200 includes input mechanisms including the mode button 210, structured on a side surface of the body 202, and the shutter button 212, structured on a top surface of the body 202. The mode button 210 may be similar to the mode button 110 shown in FIG. 1B. The shutter button 212 may be similar to the shutter button 112 shown in FIG. 1A.

The image capture apparatus 200 includes internal electronics (not expressly shown), such as imaging electronics, power electronics, and the like, internal to the body 202 for capturing images and performing other functions of the image capture apparatus 200. An example showing internal electronics is shown in FIG. 5.

As shown in FIGS. 2A-2B, the image capture apparatus 200 includes the interconnect mechanism 214 structured on a bottom surface of the body 202. The interconnect mechanism 214 may be similar to the interconnect mechanism 140 shown in FIG. 1B.

As shown in FIG. 2B, the image capture apparatus 200 includes the drainage channel 216 for draining liquid from audio components of the image capture apparatus 200.

As shown in FIGS. 2A-2B, the image capture apparatus 200 includes the audio components 218, 220, 222, respectively structured on respective surfaces of the body 202. The audio components 218, 220, 222 may be similar to the microphones 128, 130, 132 and the speaker 138 shown in FIGS. 1A-1B. One or more of the audio components 218, 220, 222 may be, or may include, audio sensors, such as microphones, to receive and record audio signals, such as voice commands or other audio, in conjunction with capturing images or video. One or more of the audio components 218, 220, 222 may be, or may include, an audio presentation component that may present, or play, audio, such as to provide notifications or alerts.

As shown in FIGS. 2A-2B, a first audio component 218 is located on a front surface of the body 202, a second audio component 220 is located on a top surface of the body 202, and a third audio component 222 is located on a back surface of the body 202. Other numbers and configurations for the audio components 218, 220, 222 may be used. For example, the audio component 218 may be a drain microphone surrounded by the drainage channel 216 and adjacent to one of the indicators 208 as shown in FIG. 2B.

As shown in FIG. 2B, the image capture apparatus 200 includes the display 224 structured on a front surface of the body 202. The display 224 may be similar to the displays 108, 142 shown in FIGS. 1A-1B. The display 224 may include an I/O interface. The display 224 may include one or more of the indicators 208. The display 224 may receive touch inputs. The display 224 may display image information during video capture. The display 224 may provide status information to a user, such as status information indicating battery power level, memory card capacity, time elapsed for a recorded video, etc. The image capture apparatus 200 may include multiple displays structured on respective surfaces of the body 202. In some implementations, the display 224 may be omitted or combined with another component of the image capture apparatus 200.

As shown in FIG. 2B, the image capture apparatus 200 includes the door 226 structured on, or forming a portion of, the side surface of the body 202. The door 226 may be similar to the door 114 shown in FIG. 1A. For example, the door 226 shown in FIG. 2A includes a release mechanism 228. The release mechanism 228 may include a latch, a button, or other mechanism configured to receive a user input that allows the door 226 to change position. The release mechanism 228 may be used to open the door 226 for a user to access a battery, a battery receptacle, an I/O interface, a memory card interface, etc.

In some embodiments, the image capture apparatus 200 may include features or components other than those described herein, some features or components described herein may be omitted, or some features or components described herein may be combined. For example, the image capture apparatus 200 may include additional interfaces or different interface features, interchangeable lenses, cold shoes, or hot shoes.

Figure 3:
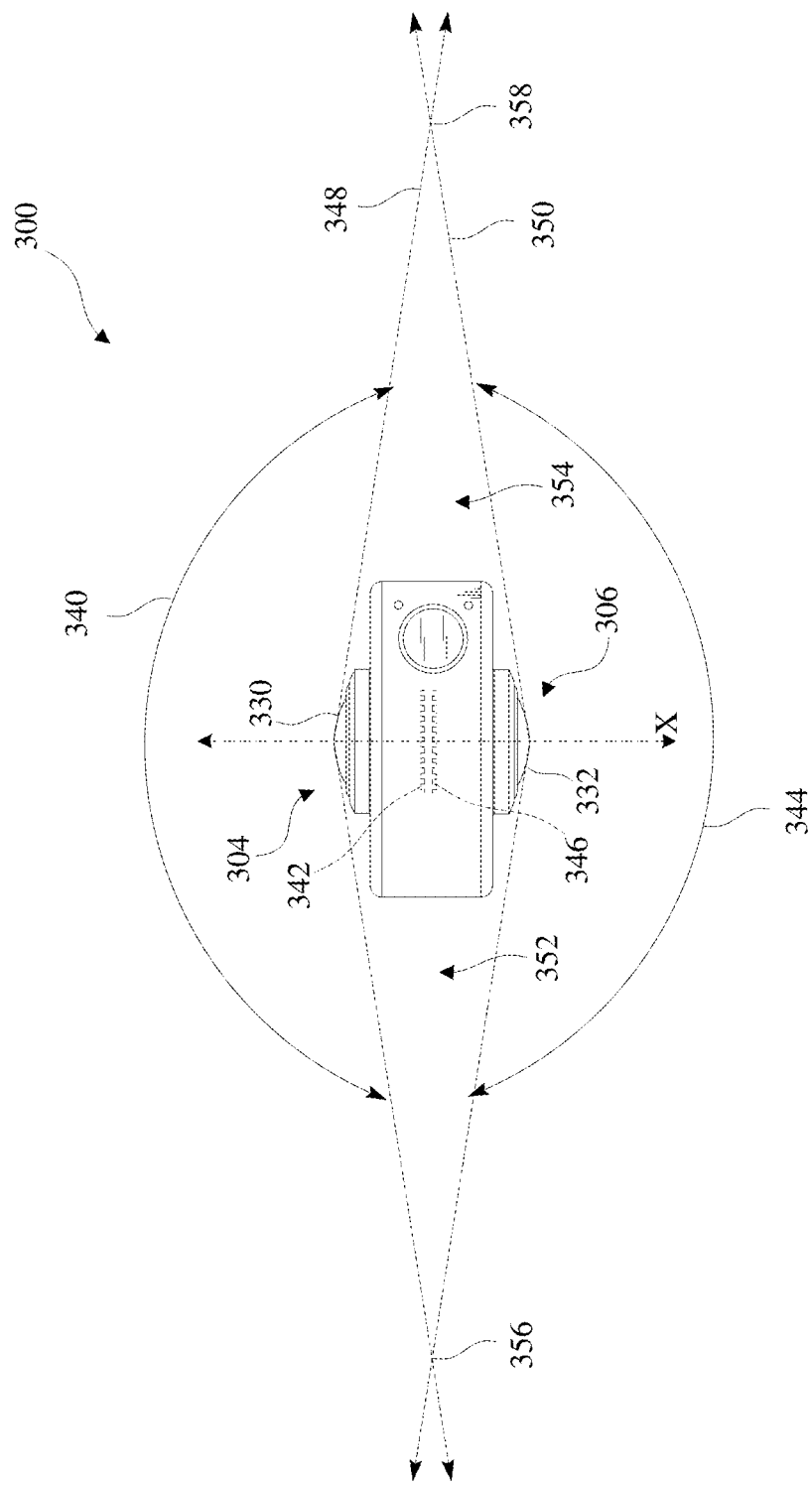
FIG. 3 is a top view of another example of an image capture apparatus.

FIG. 3 is a top view of an image capture apparatus 300. The image capture apparatus 300 is similar to the image capture apparatus 200 of FIGS. 2A-2B and is configured to capture spherical images.

As shown in FIG. 3, a first image capture device 304 includes a first lens 330 and a second image capture device 306 includes a second lens 332. For example, the first image capture device 304 may capture a first image, such as a first hemispheric, or hyper-hemispherical, image, the second image capture device 306 may capture a second image, such as a second hemispheric, or hyper-hemispherical, image, and the image capture apparatus 300 may generate a spherical image incorporating or combining the first image and the second image, which may be captured concurrently, or substantially concurrently.

The first image capture device 304 defines a first field-of-view 340 wherein the first lens 330 of the first image capture device 304 receives light. The first lens 330 directs the received light corresponding to the first field-of-view 340 onto a first image sensor 342 of the first image capture device 304. For example, the first image capture device 304 may include a first lens barrel (not expressly shown), extending from the first lens 330 to the first image sensor 342.

The second image capture device 306 defines a second field-of-view 344 wherein the second lens 332 receives light. The second lens 332 directs the received light corresponding to the second field-of-view 344 onto a second image sensor 346 of the second image capture device 306. For example, the second image capture device 306 may include a second lens barrel (not expressly shown), extending from the second lens 332 to the second image sensor 346.

A boundary 348 of the first field-of-view 340 is shown using broken directional lines. A boundary 350 of the second field-of-view 344 is shown using broken directional lines. As shown, the image capture devices 304, 306 are arranged in a back-to-back (Janus) configuration such that the lenses 330, 332 face in opposite directions, and such that the image capture apparatus 300 may capture spherical images. The first image sensor 342 captures a first hyper-hemispherical image plane from light entering the first lens 330. The second image sensor 346 captures a second hyper-hemispherical image plane from light entering the second lens 332.

As shown in FIG. 3, the fields-of-view 340, 344 partially overlap such that the combination of the fields-of-view 340, 344 forms a spherical field-of-view, except that one or more uncaptured areas 352, 354 may be outside of the fields-of-view 340, 344 of the lenses 330, 332. Light emanating from or passing through the uncaptured areas 352, 354, which may be proximal to the image capture apparatus 300, may be obscured from the lenses 330, 332 and the corresponding image sensors 342, 346, such that content corresponding to the uncaptured areas 352, 354 may be omitted from images captured by the image capture apparatus 300. In some implementations, the image capture devices 304, 306, or the lenses 330, 332 thereof, may be configured to minimize the uncaptured areas 352, 354.

Examples of points of transition, or overlap points, from the uncaptured areas 352, 354 to the overlapping portions of the fields-of-view 340, 344 are shown at 356, 358.

Images contemporaneously captured by the respective image sensors 342, 346 may be combined to form a combined image, such as a spherical image. Generating a combined image may include correlating the overlapping regions captured by the respective image sensors 342, 346, aligning the captured fields-of-view 340, 344, and stitching the images together to form a cohesive combined image. Stitching the images together may include correlating the overlap points 356, 358 with respective locations in corresponding images captured by the image sensors 342, 346. Although a planar view of the fields-of-view 340, 344 is shown in FIG. 3, the fields-of-view 340, 344 are hyper-hemispherical.

A change in the alignment, such as position, tilt, or a combination thereof, of the image capture devices 304, 306, such as of the lenses 330, 332, the image sensors 342, 346, or both, may change the relative positions of the respective fields-of-view 340, 344, may change the locations of the overlap points 356, 358, such as with respect to images captured by the image sensors 342, 346, and may change the uncaptured areas 352, 354, which may include changing the uncaptured areas 352, 354 unequally.

Incomplete or inaccurate information indicating the alignment of the image capture devices 304, 306, such as the locations of the overlap points 356, 358, may decrease the accuracy, efficiency, or both of generating a combined image. In some implementations, the image capture apparatus 300 may maintain information indicating the location and orientation of the image capture devices 304, 306, such as of the lenses 330, 332, the image sensors 342, 346, or both, such that the fields-of-view 340, 344, the overlap points 356, 358, or both may be accurately determined, which may improve the accuracy, efficiency, or both of generating a combined image.

The lenses 330, 332 may be aligned along an axis X as shown, laterally offset from each other (not shown), off-center from a central axis of the image capture apparatus 300 (not shown), or laterally offset and off-center from the central axis (not shown). Whether through use of offset or through use of compact image capture devices 304, 306, a reduction in distance between the lenses 330, 332 along the axis X may improve the overlap in the fields-of-view 340, 344, such as by reducing the uncaptured areas 352, 354.

Images or frames captured by the image capture devices 304, 306 may be combined, merged, or stitched together to produce a combined image, such as a spherical or panoramic image, which may be an equirectangular planar image. In some implementations, generating a combined image may include use of techniques such as noise reduction, tone mapping, white balancing, or other image correction. In some implementations, pixels along a stitch boundary, which may correspond with the overlap points 356, 358, may be matched accurately to minimize boundary discontinuities.

Figure 4A:
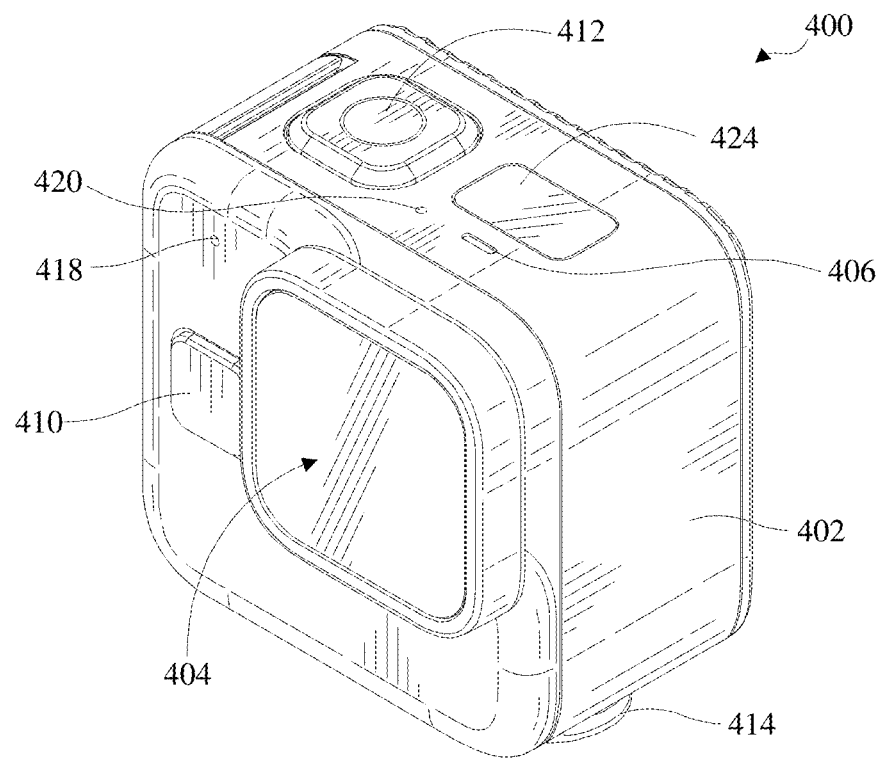
FIGS. 4A-4B are isometric views of another example of an image capture apparatus.
Figure 4B:
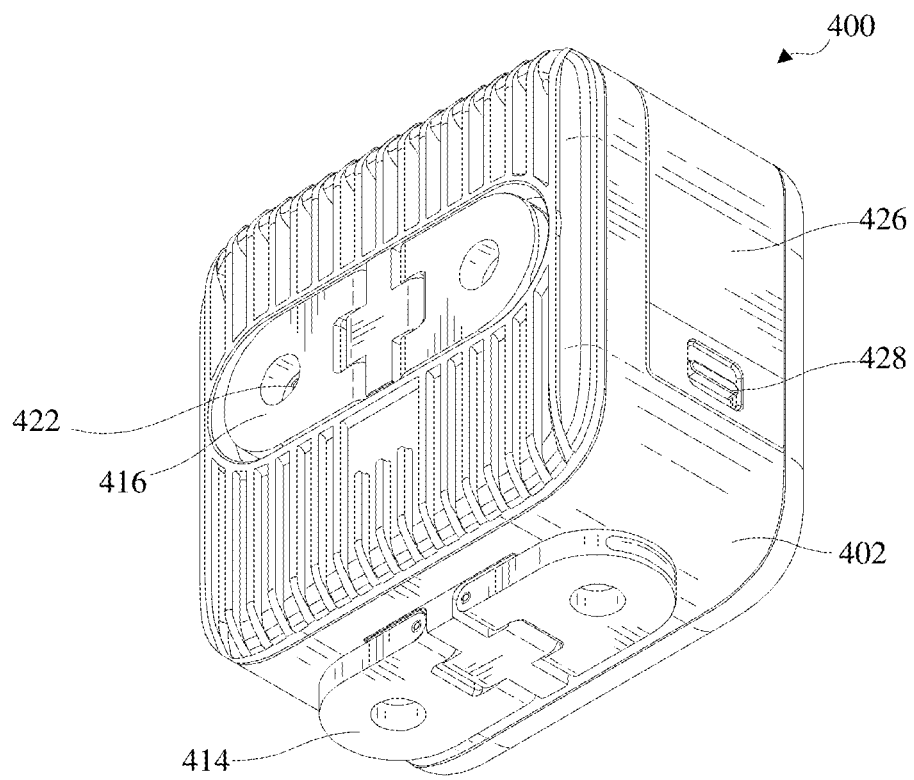

FIGS. 4A-4B illustrate another example of an image capture apparatus 400. The image capture apparatus 400 is similar to the image capture apparatus 100 shown in FIGS. 1A-1B and to the image capture apparatus 200 shown in FIGS. 2A-2B. The image capture apparatus 400 includes a body 402, an image capture device 404, an indicator 406, a mode button 410, a shutter button 412, interconnect mechanisms 414, 416, audio components 418, 420, 422, a display 424, and a door 426 including a release mechanism 428. The arrangement of the components of the image capture apparatus 400 shown in FIGS. 4A-4B is an example, other arrangements of elements may be used.

The body 402 of the image capture apparatus 400 may be similar to the body 102 shown in FIGS. 1A-1B. The image capture device 404 is structured on a front surface of the body 402. The image capture device 404 includes a lens and may be similar to the image capture device 104 shown in FIG. 1A.

As shown in FIG. 4A, the image capture apparatus 400 includes the indicator 406 on a top surface of the body 402. The indicator 406 may be similar to the indicator 106 shown in FIG. 1A. The indicator 406 may indicate a status of the image capture device 204. Although one indicator 406 is shown in FIGS. 4A, the image capture apparatus 400 may include other indictors structured on respective surfaces of the body 402.

As shown in FIGS. 4A, the image capture apparatus 400 includes input mechanisms including the mode button 410, structured on a front surface of the body 402, and the shutter button 412, structured on a top surface of the body 402. The mode button 410 may be similar to the mode button 110 shown in FIG. 1B. The shutter button 412 may be similar to the shutter button 112 shown in FIG. 1A.

The image capture apparatus 400 includes internal electronics (not expressly shown), such as imaging electronics, power electronics, and the like, internal to the body 402 for capturing images and performing other functions of the image capture apparatus 400. An example showing internal electronics is shown in FIG. 5.

As shown in FIGS. 4A-4B, the image capture apparatus 400 includes the interconnect mechanisms 414, 416, with a first interconnect mechanism 414 structured on a bottom surface of the body 402 and a second interconnect mechanism 416 disposed within a rear surface of the body 402. The interconnect mechanisms 414, 416 may be similar to the interconnect mechanism 140 shown in FIG. 1B and the interconnect mechanism 214 shown in FIG. 2A.

As shown in FIGS. 4A-4B, the image capture apparatus 400 includes the audio components 418, 420, 422 respectively structured on respective surfaces of the body 402. The audio components 418, 420, 422 may be similar to the microphones 128, 130, 132 and the speaker 138 shown in FIGS. 1A-1B. One or more of the audio components 418, 420, 422 may be, or may include, audio sensors, such as microphones, to receive and record audio signals, such as voice commands or other audio, in conjunction with capturing images or video. One or more of the audio components 418, 420, 422 may be, or may include, an audio presentation component that may present, or play, audio, such as to provide notifications or alerts.

As shown in FIGS. 4A-4B, a first audio component 418 is located on a front surface of the body 402, a second audio component 420 is located on a top surface of the body 402, and a third audio component 422 is located on a rear surface of the body 402. Other numbers and configurations for the audio components 418, 420, 422 may be used.

As shown in FIG. 4A, the image capture apparatus 400 includes the display 424 structured on a front surface of the body 402. The display 424 may be similar to the displays 108, 142 shown in FIGS. 1A-1B. The display 424 may include an I/O interface. The display 424 may receive touch inputs. The display 424 may display image information during video capture. The display 424 may provide status information to a user, such as status information indicating battery power level, memory card capacity, time elapsed for a recorded video, etc. The image capture apparatus 400 may include multiple displays structured on respective surfaces of the body 402. In some implementations, the display 424 may be omitted or combined with another component of the image capture apparatus 200.

As shown in FIG. 4B, the image capture apparatus 400 includes the door 426 structured on, or forming a portion of, the side surface of the body 402. The door 426 may be similar to the door 226 shown in FIG. 2B. The door 426 shown in FIG. 4B includes the release mechanism 428. The release mechanism 428 may include a latch, a button, or other mechanism configured to receive a user input that allows the door 426 to change position. The release mechanism 428 may be used to open the door 426 for a user to access a battery, a battery receptacle, an I/O interface, a memory card interface, etc.

In some embodiments, the image capture apparatus 400 may include features or components other than those described herein, some features or components described herein may be omitted, or some features or components described herein may be combined. For example, the image capture apparatus 400 may include additional interfaces or different interface features, interchangeable lenses, cold shoes, or hot shoes.

FIG. 5 is a block diagram of electronic components in an image capture apparatus 500. The image capture apparatus 500 may be a single-lens image capture device, a multi-lens image capture device, or variations thereof, including an image capture apparatus with multiple capabilities such as the use of interchangeable integrated sensor lens assemblies. Components, such as electronic components, of the image capture apparatus 100 shown in FIGS. 1A-1B, the image capture apparatus 200 shown in FIGS. 2A-2B, the image capture apparatus 300 shown in FIG. 3, or the image capture apparatus 400 shown in FIGS. 4A-4B, may be implemented as shown in FIG. 5.

The image capture apparatus 500 includes a body 502. The body 502 may be similar to the body 102 shown in FIGS. 1A-1B, the body 202 shown in FIGS. 2A-2B, or the body 402 shown in FIGS. 4A-4B. The body 502 includes electronic components such as capture components 510, processing components 520, data interface components 530, spatial sensors 540, power components 550, user interface components 560, and a bus 580.

The capture components 510 include an image sensor 512 for capturing images. Although one image sensor 512 is shown in FIG. 5, the capture components 510 may include multiple image sensors. The image sensor 512 may be similar to the image sensors 342, 346 shown in FIG. 3. The image sensor 512 may be, for example, a charge-coupled device (CCD) sensor, an active pixel sensor (APS), a complementary metal-oxide-semiconductor (CMOS) sensor, or an N-type metal-oxide-semiconductor (NMOS) sensor. The image sensor 512 detects light, such as within a defined spectrum, such as the visible light spectrum or the infrared spectrum, incident through a corresponding lens such as the first lens 330 with respect to the first image sensor 342 or the second lens 332 with respect to the second image sensor 346 as shown in FIG. 3. The image sensor 512 captures detected light as image data and conveys the captured image data as electrical signals (image signals or image data) to the other components of the image capture apparatus 500, such as to the processing components 520, such as via the bus 580.

The capture components 510 include a microphone 514 for capturing audio. Although one microphone 514 is shown in FIG. 5, the capture components 510 may include multiple microphones. The microphone 514 detects and captures, or records, sound, such as sound waves incident upon the microphone 514. The microphone 514 may detect, capture, or record sound in conjunction with capturing images by the image sensor 512. The microphone 514 may detect sound to receive audible commands to control the image capture apparatus 500. The microphone 514 may be similar to the microphones 128, 130, 132 shown in FIGS. 1A-1B, the audio components 218, 220, 222 shown in FIGS. 2A-2B, or the audio components 418, 420, 422 shown in FIGS. 4A-4B.

The processing components 520 perform image signal processing, such as filtering, tone mapping, or stitching, to generate, or obtain, processed images, or processed image data, based on image data obtained from the image sensor 512. The processing components 520 may include one or more processors having single or multiple processing cores. In some implementations, the processing components 520 may include, or may be, an application specific integrated circuit (ASIC) or a digital signal processor (DSP). For example, the processing components 520 may include a custom image signal processor. The processing components 520 conveys data, such as processed image data, with other components of the image capture apparatus 500 via the bus 580. In some implementations, the processing components 520 may include an encoder, such as an image or video encoder that may encode, decode, or both, the image data, such as for compression coding, transcoding, or a combination thereof.

Although not shown expressly in FIG. 5, the processing components 520 may include memory, such as a random-access memory (RAM) device, which may be non-transitory computer-readable memory. The memory of the processing components 520 may include executable instructions and data that can be accessed by the processing components 520.

The data interface components 530 communicates with other, such as external, electronic devices, such as a remote control, a smartphone, a tablet computer, a laptop computer, a desktop computer, or an external computer storage device. For example, the data interface components 530 may receive commands to operate the image capture apparatus 500. In another example, the data interface components 530 may transmit image data to transfer the image data to other electronic devices. The data interface components 530 may be configured for wired communication, wireless communication, or both. As shown, the data interface components 530 include an I/O interface 532, a wireless data interface 534, and a storage interface 536. In some implementations, one or more of the I/O interface 532, the wireless data interface 534, or the storage interface 536 may be omitted or combined.

The I/O interface 532 may send, receive, or both, wired electronic communications signals. For example, the I/O interface 532 may be a universal serial bus (USB) interface, such as USB type-C interface, a high-definition multimedia interface (HDMI), a FireWire interface, a digital video interface link, a display port interface link, a Video Electronics Standards Associated (VESA) digital display interface link, an Ethernet link, or a Thunderbolt link. Although one I/O interface 532 is shown in FIG. 5, the data interface components 530 include multiple I/O interfaces. The I/O interface 532 may be similar to the data interface 124 shown in FIG. 1B.

The wireless data interface 534 may send, receive, or both, wireless electronic communications signals. The wireless data interface 534 may be a Bluetooth interface, a ZigBee interface, a Wi-Fi interface, an infrared link, a cellular link, a near field communications (NFC) link, or an Advanced Network Technology interoperability (ANT+) link. Although one wireless data interface 534 is shown in FIG. 5, the data interface components 530 include multiple wireless data interfaces. The wireless data interface 534 may be similar to the data interface 124 shown in FIG. 1B.

The storage interface 536 may include a memory card connector, such as a memory card receptacle, configured to receive and operatively couple to a removable storage device, such as a memory card, and to transfer, such as read, write, or both, data between the image capture apparatus 500 and the memory card, such as for storing images, recorded audio, or both captured by the image capture apparatus 500 on the memory card. Although one storage interface 536 is shown in FIG. 5, the data interface components 530 include multiple storage interfaces. The storage interface 536 may be similar to the data interface 124 shown in FIG. 1B.

The spatial, or spatiotemporal, sensors 540 detect the spatial position, movement, or both, of the image capture apparatus 500. As shown in FIG. 5, the spatial sensors 540 include a position sensor 542, an accelerometer 544, and a gyroscope 546. The position sensor 542, which may be a global positioning system (GPS) sensor, may determine a geospatial position of the image capture apparatus 500, which may include obtaining, such as by receiving, temporal data, such as via a GPS signal. The accelerometer 544, which may be a three-axis accelerometer, may measure linear motion, linear acceleration, or both of the image capture apparatus 500. The gyroscope 546, which may be a three-axis gyroscope, may measure rotational motion, such as a rate of rotation, of the image capture apparatus 500. In some implementations, the spatial sensors 540 may include other types of spatial sensors. In some implementations, one or more of the position sensor 542, the accelerometer 544, and the gyroscope 546 may be omitted or combined.

The power components 550 distribute electrical power to the components of the image capture apparatus 500 for operating the image capture apparatus 500. As shown in FIG. 5, the power components 550 include a battery interface 552, a battery 554, and an external power interface 556 (ext. interface). The battery interface 552 (bat. interface) operatively couples to the battery 554, such as via conductive contacts to transfer power from the battery 554 to the other electronic components of the image capture apparatus 500. The battery interface 552 may be similar to the battery receptacle 126 shown in FIG. 1B. The external power interface 556 obtains or receives power from an external source, such as a wall plug or external battery, and distributes the power to the components of the image capture apparatus 500, which may include distributing power to the battery 554 via the battery interface 552 to charge the battery 554. Although one battery interface 552, one battery 554, and one external power interface 556 are shown in FIG. 5, any number of battery interfaces, batteries, and external power interfaces may be used. In some implementations, one or more of the battery interface 552, the battery 554, and the external power interface 556 may be omitted or combined. For example, in some implementations, the external interface 556 and the I/O interface 532 may be combined.

The user interface components 560 receive input, such as user input, from a user of the image capture apparatus 500, output, such as display or present, information to a user, or both receive input and output information, such as in accordance with user interaction with the image capture apparatus 500.

As shown in FIG. 5, the user interface components 560 include visual output components 562 to visually communicate information, such as to present captured images. As shown, the visual output components 562 include an indicator 564 and a display 566. The indicator 564 may be similar to the indicator 106 shown in FIG. 1A, the indicators 208 shown in FIGS. 2A-2B, or the indicator 406 shown in FIG. 4A. The display 566 may be similar to the display 108 shown in FIG. 1A, the display 142 shown in FIG. 1B, the display 224 shown in FIG. 2B, or the display 424 shown in FIG. 4A. Although the visual output components 562 are shown in FIG. 5 as including one indicator 564, the visual output components 562 may include multiple indicators. Although the visual output components 562 are shown in FIG. 5 as including one display 566, the visual output components 562 may include multiple displays. In some implementations, one or more of the indicator 564 or the display 566 may be omitted or combined.

As shown in FIG. 5, the user interface components 560 include a speaker 568. The speaker 568 may be similar to the speaker 138 shown in FIG. 1B, the audio components 218, 220, 222 shown in FIGS. 2A-2B, or the audio components 418, 420, 422 shown in FIGS. 4A-4B. Although one speaker 568 is shown in FIG. 5, the user interface components 560 may include multiple speakers. In some implementations, the speaker 568 may be omitted or combined with another component of the image capture apparatus 500, such as the microphone 514.

As shown in FIG. 5, the user interface components 560 include a physical input interface 570. The physical input interface 570 may be similar to the mode buttons 110, 210, 410 shown in FIGS. 1A, 2A, and 4A or the shutter buttons 112, 212, 412 shown in FIGS. 1A, 2B, and 4A. Although one physical input interface 570 is shown in FIG. 5, the user interface components 560 may include multiple physical input interfaces. In some implementations, the physical input interface 570 may be omitted or combined with another component of the image capture apparatus 500. The physical input interface 570 may be, for example, a button, a toggle, a switch, a dial, or a slider.

As shown in FIG. 5, the user interface components 560 include a broken line border box labeled "other" to indicate that components of the image capture apparatus 500 other than the components expressly shown as included in the user interface components 560 may be user interface components. For example, the microphone 514 may receive, or capture, and process audio signals to obtain input data, such as user input data corresponding to voice commands. In another example, the image sensor 512 may receive, or capture, and process image data to obtain input data, such as user input data corresponding to visible gesture commands. In another example, one or more of the spatial sensors 540, such as a combination of the accelerometer 544 and the gyroscope 546, may receive, or capture, and process motion data to obtain input data, such as user input data corresponding to motion gesture commands.

Figure 6:
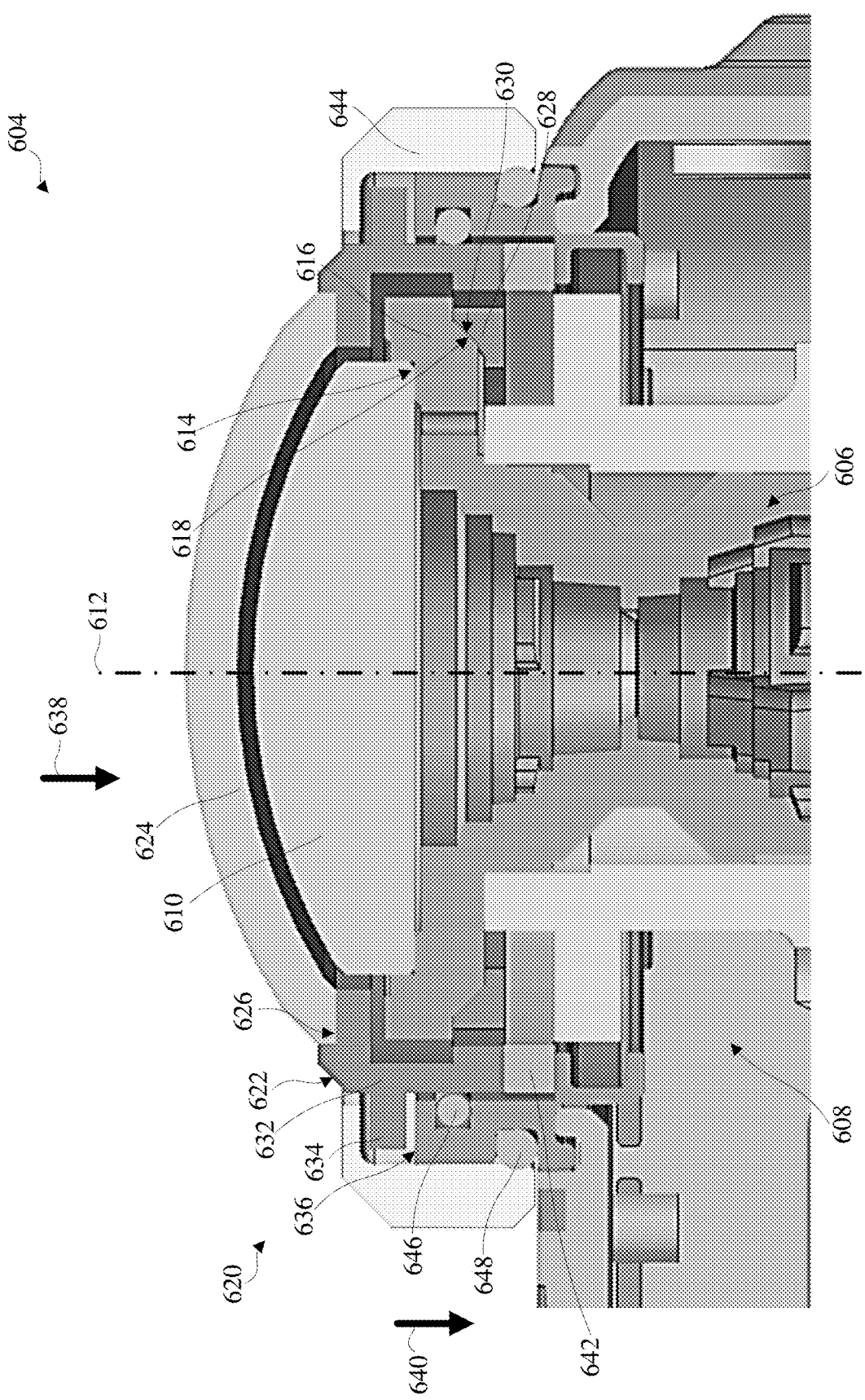
FIG. 6 is a partial cross-sectional view of an image capture device that includes a replaceable lens module.

FIG. 6 is a partial cross-sectional view of an image capture device 604. The image capture device 604 may be similar to the image capture devices 104, 204, 206, 304, 306, 404 described above. A portion of the image capture device 604 has been removed from the partial cross-sectional view for clarity and simplicity.

The image capture device 604 may include a lens barrel 606 disposed in a body 608 of the image capture device 604. The lens barrel 606 may include an internal lens 610 disposed within the lens barrel 606 that is configured to align with an optical axis 612 of the lens barrel 606. The lens barrel 606 may include one or more of the internal lens 610 disposed within the lens barrel 606, whereby the one or more of the internal lens 610 are axially aligned with each other along the optical axis 612.

The image capture device 604 may also include a bayonet 614. The bayonet 614 may be coupled to, or integrally formed with, the lens barrel 606. For example, the bayonet 614 may be coupled to the lens barrel 606 and may include one or more fingers 616 that extend radially outward from the optical axis 612 of the lens barrel 606. The fingers 616 may extend radially outward from the lens barrel 606 and may be positioned around an outer edge of the bayonet 614 in any desired manner. All or a portion of the fingers 616 may include a mounting surface 618 configured to contact a portion of a replaceable lens module 620 of the image capture device 604 to removably couple the replaceable lens module 620 to the image capture device 604.

The replaceable lens module 620 may be configured to releasably couple to the bayonet 614 (e.g., the fingers 616 of the bayonet 614) to facilitate easy connection to, and disconnection from, the image capture device 604. Therefore, the replaceable lens module 620 may be interchangeable with another replaceable lens module 620, other secondary accessories of the image capture device 604 (e.g., a telescoping lens, protective cover, etc.), or both. Additionally, due to the replaceable lens module 620 being configured to releasably couple to the bayonet 614, the replaceable lens module 620 may also be replaced and/or repaired if damaged.

The replaceable lens module 620 may include a housing 622 and an external lens 624 disposed in a lens recess 626 of the housing 622. The housing 622 of the replaceable lens module 620 may be configured to removably couple the replaceable lens module 620 to the bayonet 614 of the image capture device 604 to axially align the external lens 624 of the replaceable lens module 620 with the optical axis 612. The replaceable lens module 620 may be configured to axially align the external lens 624 of the replaceable lens module 620 and the lens barrel 606 of the image capture device 604 to maintain clarity of any image and/or video captured by the image capture device 604 through the lens barrel 606 and the replaceable lens module 620.

To removably couple the housing 622 to the bayonet 614, a first projection 628 of the housing 622 may be configured to engage the fingers 616 of the bayonet 614 (e.g., the first projection 628 may engage the mounting surface 618 of each of the fingers 616 of the bayonet 614). For example, an engaging surface 630 of the first projection 628 of the housing 622 may contact the mounting surface 618 of the fingers 616 of the bayonet 614 to removably couple the replaceable lens module 620 to the bayonet 614. As discussed in further detail below, the mounting surface 618 of each of the fingers 616 of the bayonet 614 and/or the engaging surface 630 of the first projection 628 of the housing 622 may include one or more features to interlock the first projection 628 and the fingers 616 to maintain a position of the replaceable lens module 620 with respect to the lens barrel 606 about the optical axis 612.

As shown in FIG. 6, the first projection 628 of the housing 622 and the fingers 616 of the bayonet 614 may be complementary in shape. For example, the first projection 628 and the fingers 616 may both be tapered so that the engaging surface 630 of the first projection 628 may be substantially flush with the mounting surface 618 of the fingers 616 of the bayonet 614 when the replaceable lens module 620 is removably coupled to the bayonet 614. The first projection 628 of the housing 622 and the fingers 616 of the bayonet 614 may also be dissimilar in shape to, for example, increase friction between the housing 622 and the bayonet 614, thereby maintaining a position of the replaceable lens module 620 with respect to the lens barrel 606. Additionally, the first projection 628 may be a continuous projection of the housing 622 that is configured to engage the fingers 616 of the bayonet 614, or the housing 622 may include more than one of the first projection 628. For example, the housing 622 may include more than one of the first projection 628, whereby each one of the first projection 628 may be configured to align with, and engage, a respective one of the fingers 616.

The housing 622 may also include an axial portion 632 that extends substantially parallel to the optical axis 612 of the lens barrel 606. The axial portion 632 may substantially form a body or overall structure of the housing 622. The axial portion 632 may extend any length in a direction parallel to the optical axis 612 towards the body 608 of the image capture device 604 and/or away from the body 608 of the image capture device 604. All or a portion of the axial portion 632 may be disposed within the body 608 of the image capture device 604 or a cavity therein.

The first projection 628 may extend radially inward from the axial portion 632 towards the optical axis 612 to releasably couple the replaceable lens module 620 to the bayonet 614. The first projection 628 may extend radially inward from the axial portion 632 towards the optical axis 612 in a direction substantially perpendicular to the optical axis 612 or in another direction nonparallel to the optical axis 612. Additionally, the housing 622 may include a second projection 634 that extends radially outward from the axial portion 632 away from the optical axis 612. The second projection 634 may extend radially outward from the axial portion 632 in a direction substantially perpendicular to the optical axis 612 or in another direction nonparallel to the optical axis 612. The second projection 634 may be substantially parallel or nonparallel to the first projection 628. The second projection 634 may be configured to contact the body 608 of the image capture device 604. For example, the second projection 634 may extend radially outward from the axial portion 632 so that the second projection 634 may be positioned adjacent to a travel stop 636 of the body 608 of the image capture device 604. The travel stop 636 may be a surface, component, projection, or any other portion of the body 608 of the image capture device 604 that is configured to contact the second projection 634 of the housing 622 during movement of the housing 622.

The housing 622 may be configured to move with respect to one or more components of the image capture device 604. The housing 622 may be configured to move with respect to the lens barrel 606, the body 608 of the image capture device 604, or both. For example, the housing 622 may be configured to move axially with respect to the lens barrel 606 along the optical axis 612 of the lens barrel 606. Due to movement of the housing 622, one or more additional components of the replaceable lens module 620 may also move with the housing 622. For example, the external lens 624 may be disposed in the lens recess 626 and coupled to the housing 622 so that, when the housing 622 moves axially with respect to the lens barrel 606 along the optical axis 612, the external lens 624 also moves axially with respect to the lens barrel 606 along the optical axis 612.

The housing 622 may be configured to move with respect to the lens barrel 606 due to an impact force applied to the replaceable lens module 620, such as an external impact for a direction 638. It should be noted that the direction 638 is only an exemplary direction of an impact force applied to the replaceable lens module 620, and the impact force may be applied in any number of directions to the replaceable lens module 620. For example, the impact force may be applied to the external lens 624, the housing 622, or both.

The housing 622 may move in a direction 640 due to the impact force applied to the replaceable lens module 620 in the direction 638. The housing 622 may be configured to move in the direction 640 due to the impact force being applied to the replaceable lens module 620 in another direction. The housing 622 may be configured to move in the direction 640 substantially parallel to the optical axis 612 of the lens barrel 606 based upon the impact force applied to the replaceable lens module 620. The housing 622 may move in the direction 640 based upon the impact force meeting one or more predetermined thresholds. For example, the image capture device 604 may include a biasing element 642 coupled to the housing 622 or coupled to the bayonet 614 that is configured to bias the housing 622 against the lens barrel 606. When an impact force that meets a predetermined threshold corresponding to a force needed to compress the biasing element 642 is applied to an exterior surface of the replaceable lens module 620 (e.g., applied in the direction 638 to an outer surface of the external lens 624 or the housing 622), the housing 622 may be configured to compress the biasing element 642 and disengage the lens barrel 606. If the external impact applied to the exterior surface of the replaceable lens module 620 does not meet the predetermined threshold, the biasing element 642 may remain uncompressed, and the housing 622 may maintain contact with the bayonet 614. When the impact force that meets the predetermined threshold is applied to the exterior surface of the replaceable lens module 620, the housing 622 may be configured to move substantially parallel to the optical axis 612 of the lens barrel 606 so that the housing 622 may disengage the lens barrel 606.

The movement of the replaceable lens module 620 relative to the lens barrel 606 may provide a means to direct the impact force away from the lens barrel 606. As discussed above, the lens barrel 606 may be configured to align one or more lenses similar to the internal lens 610 along the optical axis 612. Due to the tight tolerances and constraints of the lens barrel 606, misalignment of the internal lens 610 may result in images and/or videos captured by the image capture device 604 being distorted or otherwise unclear. Misalignment of the internal lens 610 or other damage to the lens barrel 606 that may negatively impact image and/or video capture may be caused by the impact force. For example, the impact force applied to the replaceable lens module 620 in the direction 638 may be due to dropping the image capture device 604 or a secondary object impacting the image capture device 604. To prevent damage to the lens barrel 606, the replaceable lens module 620 may be configured to deflect the impact force away from the lens barrel 606 by allowing the housing 622 to move with respect to the lens barrel 606. When the impact force that meets the predetermined threshold (e.g., the threshold in which the impact force is sufficient to cause the housing 622 to compress the biasing element 642) is applied to the replaceable lens module 620, the impact force may be transmitted through the housing 622 and away from the lens barrel 606 to avoid damage and/or misalignment of the lens barrel 606. As a result, all or a portion of the impact force may be absorbed by components of the image capture device 604 other than the lens barrel 606 that may be easily replaced and/or repaired, such as the replaceable lens module 620.

The following will discuss the movement of the replaceable lens module 620 in further detail, as shown in FIG. 6. When the impact force that meets the predetermined threshold is applied to the exterior surface of the replaceable lens module 620, the housing 622 may be configured to move towards the body 608 of the image capture device 604 until the housing 622 contacts the travel stop 636 located on the body 608 of the image capture device 604. The impact force that meets the predetermined threshold may be received by the external lens 624 and/or the housing 622 in the direction 638, and as a result, the housing 622 may be configured to move substantially parallel to the optical axis 612 of the lens barrel 606 in the direction 640 towards the body 608 of the image capture device 604 until the second projection 634 of the housing 622 contacts the travel stop 636, thereby preventing further travel of the housing 622 in the direction 640 towards the body 608. During such movement, the biasing element 642 may be compressed by the housing 622 so that the engaging surface 630 of the housing 622 (e.g., the engaging surface 630 of the first projection 628) may be configured to separate from the mounting surface 618 of the lens barrel 606 (e.g., the mounting surface 618 of the fingers 616 of the bayonet 614) so that the housing 622 is free of contact with the lens barrel 606 and the impact force is transmitted through the housing 622 and away from the lens barrel 606.

The second projection 634 may be configured to contact the body 608 (e.g., the travel stop 636) of the image capture device 604 when the engaging surface 630 of the housing 622 separates from the mounting surface 618 of the lens barrel 606 to transmit the impact force through the housing 622 and away from the lens barrel 606. For example, the first projection 628 may be configured to be free of contact with both the lens barrel 606 and the body 608 of the image capture device 604 when the second projection 634 contacts the body 608 (e.g., the travel stop 636) of the image capture device 604 so that the impact force is transmitted through the housing 622 and into the body 608 of the image capture device 604 instead of the lens barrel 606, thereby protecting the lens barrel 606 from damage and/or misalignment.

When the impact force does not meet or exceed the predetermined threshold for compressing the biasing element 642, the biasing element 642 may remain uncompressed and help maintain engagement between the replaceable lens module 620 and the lens barrel 606. The biasing element 642 may be configured to exert a biasing force on the housing 622 to retain contact between the engaging surface 630 of the first projection 628 and the surface 618 of the fingers 616 of the bayonet 614. Prior to an impact force being applied to the replaceable lens module 620 and/or when the impact force is below the predetermined threshold for compressing the biasing element 642, the biasing element 642 may continue to bias the housing 622 against the bayonet 614. The biasing force applied to the housing 622 by the biasing element 642 may be in any direction, such as a direction opposite to the direction 640 of movement of the housing 622.

The biasing element 642 may be disposed anywhere within the image capture device 604 that may facilitate communication between the biasing element 642 and the housing 622. For example, the biasing element 642 may be located between the housing 622 and the body 608 of the image capture device 604. The biasing element 642 may be positioned in a groove, channel, or recess within the housing 622 or the body 608 to couple the biasing element 642 to the housing 622 and/or the body 608. The biasing element 642 may also be secured to the housing 622 and/or the body 608 by an adhesive, one or more fasteners, or both. Additionally, the biasing element 642 may be a spring, elastic member, memory-shape material, or a combination thereof. As such, the biasing element 642 is not limited to any particular structure and may be any configuration that facilitates compression and operation as discussed above.

The replaceable lens module 620 may also include a cap 644 coupled to the housing 622 and configured to couple to the body 608 of the image capture device 604. The cap 644 may be coupled to the housing 622 and configured to at least partially conceal the housing 622 from view from a position exterior to the image capture device 604. For example, the cap 644 may be configured to extend radially and/or axially with respect to the optical axis 612 along one or more surfaces of the housing 622 to at least partially conceal the housing 622 from view from a position exterior to the image capture device 604. As a result, the cap 644 may protect the housing 622 from damage caused by debris and/or moisture.

As stated above, the cap 644 may be configured to couple to the body 608 of the image capture device 604. That cap 644 may couple to the body 608 before, during, or after the housing 622 is removably coupled to the bayonet 614 of the lens barrel 606. The cap 644 may be threaded onto a portion of the body 608 or may be secured in any other manner, such as a secondary bayonet similar to the bayonet 614 of the lens barrel 606, one or more fasteners, other interlocking components, or a combination thereof.

Additionally, due to the removable coupling of the replaceable lens module 620 with the lens barrel 606, the image capture device 604 may also include one or more seals to ensure moisture (e.g., water) and/or debris is prevented from entering the internal components of the image capture device 604, such as a region of the image capture device 604 between the replaceable lens module 620 and the lens barrel 606, between the cap 644 and the housing 622 of the replaceable lens module 620, between the replaceable lens module 620 and the body 608 of the image capture device 604, or a combination thereof. For example, the image capture device 604 may include a first seal 646 compressible between the housing 622 and the body 608 of the image capture device 604. The first seal 646 may be located in a channel or groove of the body 608 and/or the housing 622 to prevent moisture from penetrating a space between the body 608 and the housing 622. Additionally, the image capture device 604 may include a second seal 648 compressible between the cap 644 and the body 608 of the image capture device 604. The second seal 648 may be located in a channel or groove of the cap 644 and/or the body 608 to prevent moisture from penetrating a space between the cap 644 and the body 608. The first seal 646 and the second seal 648 may be structurally similar or different. The first seal 646 and the second seal 648 are not limited to any particular type of seal.

Figure 7A:
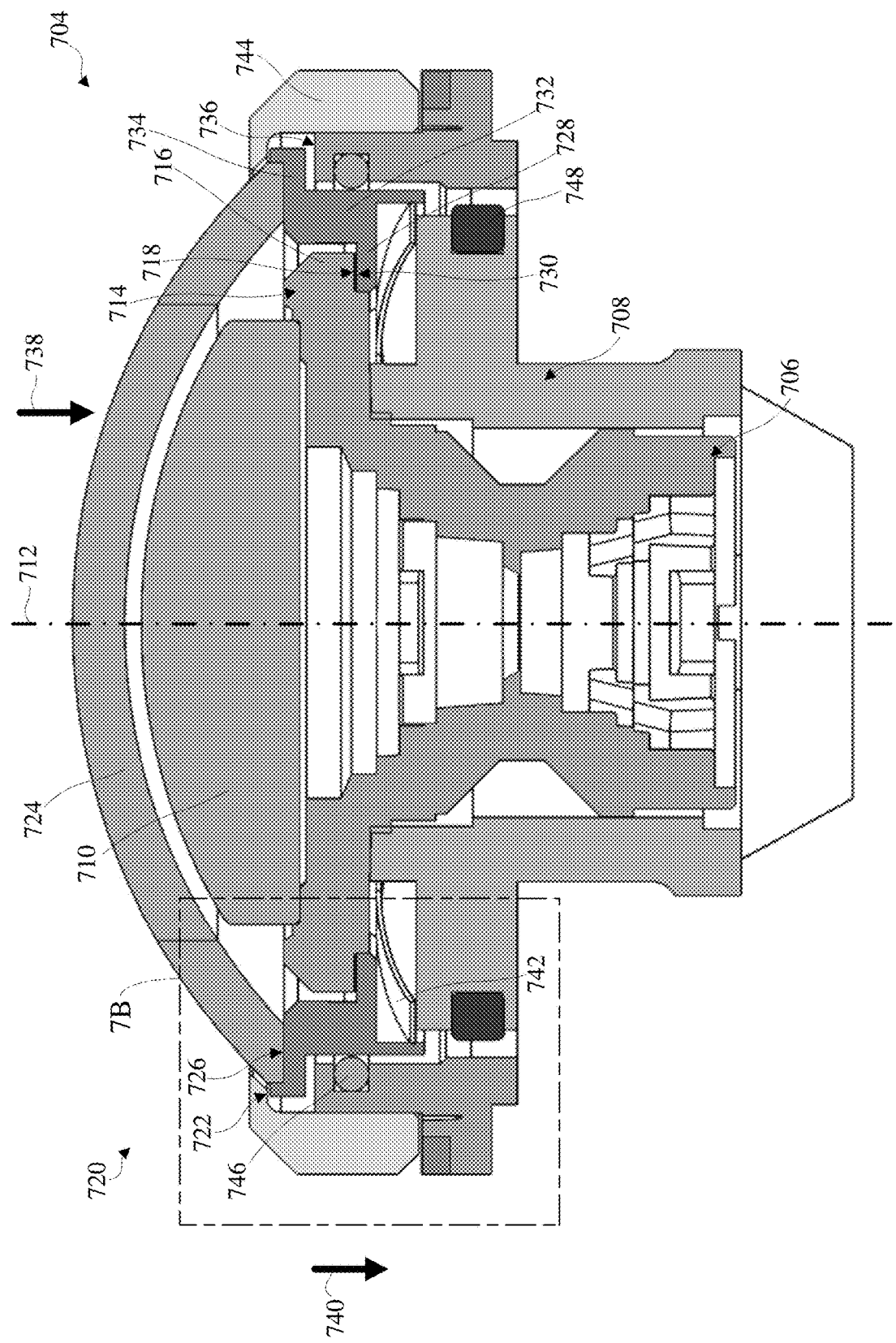
FIG. 7A is a partial cross-sectional view of an image capture device that includes a replaceable lens module.
Figure 7B:
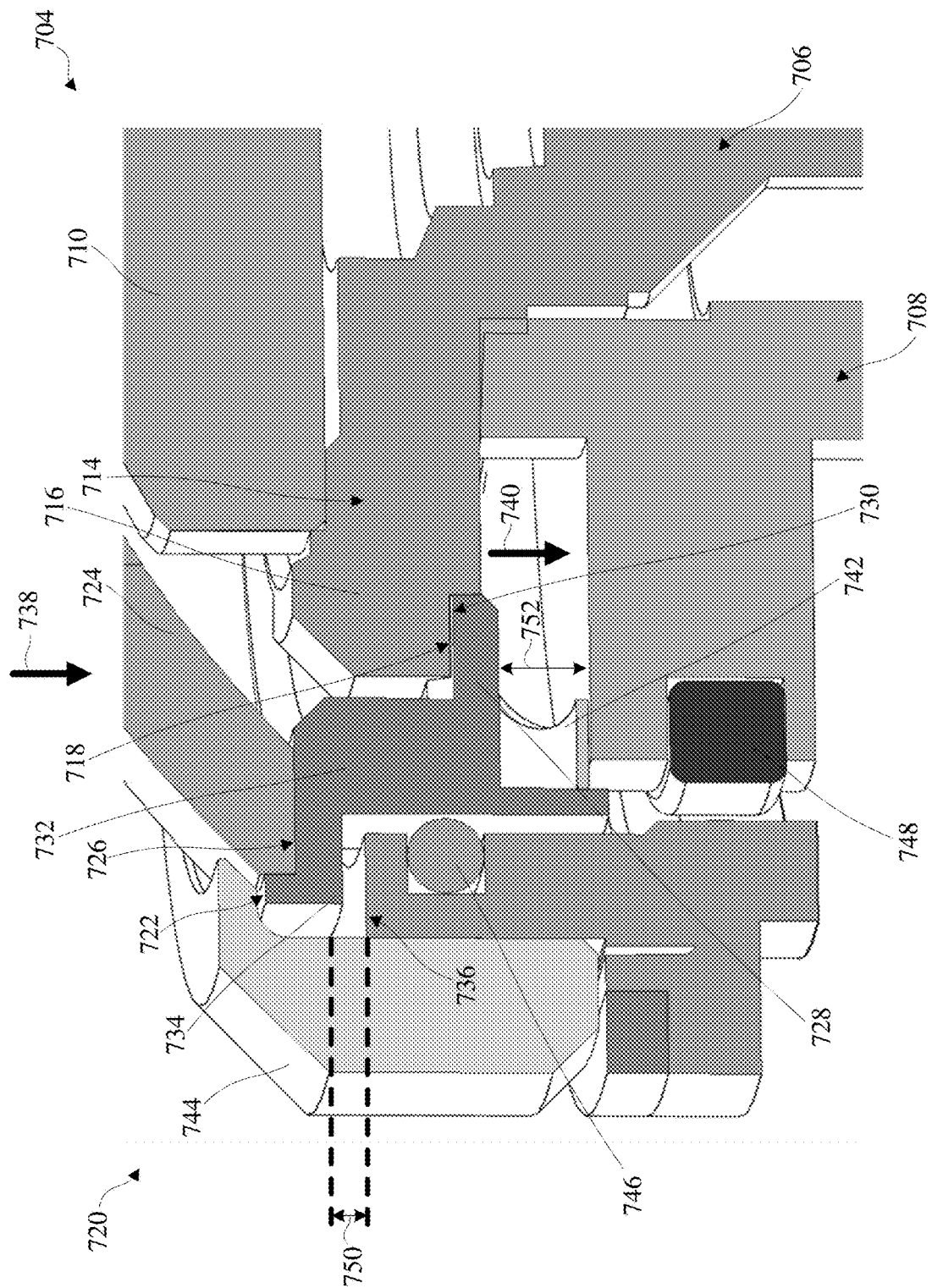
FIG. 7B is a close-up cross-sectional view of the image capture device of FIG. 7A.

FIG. 7A is a partial cross-sectional view of an image capture device 704 and FIG. 7B is a close-up cross-sectional view of the image capture device 704 shown in FIG. 7A. The image capture device 704 may be similar to the image capture devices 104, 204, 206, 304, 306, 404, 604 described above. Portions of the image capture device 704 have been removed from the partial cross-sectional views for clarity and simplicity.

The image capture device 704 may include a lens barrel 706 disposed in a body 708 of the image capture device 704. The lens barrel 706 may include one or more lenses, such as an internal lens 710, disposed within the lens barrel 706 that is axially aligned with an optical axis 712 of the lens barrel 706. The lens barrel 706 may be similar to the lens barrel 606. The lens barrel 706 may include a bayonet 714 having one or more fingers 716 extending radially outward from the bayonet 714, such as extending away from the optical axis 712.

The fingers 716 of the bayonet 714 may each include a mounting surface 718 that is configured to contact a portion of a replaceable lens module 720 to facilitate removable coupling of the replaceable lens module 720 to lens barrel 706. For example, the mounting surface 718 may be configured to engage a portion of a housing 722 of the replaceable lens module 720. The housing 722 may be similar to the housing 622 of the image capture device 604 described above. For example, the housing 722 may include an external lens 724 disposed and/or secured within a lens recess 726 of the housing 722.

The housing 722 may include a first projection 728 that is configured to engage the bayonet 714 of the lens barrel 706. For example, an engaging surface 730 of the housing 722 is located on the first projection 728 and may be configured to contact the mounting surface 718 of the one or more fingers 716 of the bayonet 714. The first projection 728 may extend radially inward towards the optical axis 712 from an axial portion 732 of the housing 722. The axial portion 732 of the housing 722 may be any size and/or shape. The axial portion 732 may also extend substantially parallel to the optical axis 712 of the lens barrel 706. Additionally, a second projection 734 may extend radially outward from the axial portion 732 of the housing 722 away from the optical axis 712 of the lens barrel 706. As discussed below, the second projection 734 may be configured to contact a travel stop 736 of the image capture device 704.

The replaceable lens module 720 may be configured to removably couple to the lens barrel 706 to facilitate easy removal and connection of the replaceable lens module 720 with respect to the lens barrel 706. The replaceable lens module 720 may also be configured to removably couple to the bayonet 714 to align the replaceable lens module 720 with the lens barrel 706 along the optical axis 712. That is, the lens recess 726 of the replaceable lens module 720 may be configured to axially align with the lens barrel 706 disposed in the body 708 of the image capture device 704, thereby aligning the lens recess 726 with the internal lens 710 of the lens barrel 706.

The housing 722 and/or other portions of the replaceable lens module 720 may be configured to move with respect to the lens barrel 706. For example, the housing 722 may be configured move outward and inward with respect to the body 708 of the image capture device 704 in a direction substantially parallel to the optical axis 712 of the lens barrel 706. Movement of the housing 722 may separate the engaging surface 730 of the housing 722 from the mounting surface 718 of the lens barrel 706 (e.g., the mounting surface 718 of the fingers 716 of the bayonet 714) when an impact force is applied to the outer surface of the replaceable lens module 720, such as an impact force applied in a direction 738. As shown in FIGS. 7A and 7B, when the impact force is applied to the replaceable lens module 720 in the direction 738, the housing 722 may be configured to move in a direction 740 that is substantially parallel—and in certain configurations nonparallel—to the optical axis 712, thereby decoupling the housing 722 from the lens barrel 706.

The housing 722 may thus be free of contact with the lens barrel 706 when the impact force is applied to the replaceable lens module 720 to facilitate deflection of the impact force away from the lens barrel 706. By deflecting the impact force away from the lens barrel 706, damage and/or distortion of the lens barrel 706 caused by the impact force may be prevented. As a result, other components of the image capture device 704 may instead receive the impact force and may be better equipped to withstand such a force. For example, the impact force may be deflected through the housing 722 and into the body 708 of the image capture device 704, whereby the body 708 may withstand the impact force and not require any repair or replacement. Thus, the housing 722 and the replaceable lens module 720 may be configured to prevent costly and potentially catastrophic damage to the lens barrel 706, such as damage to the lens barrel 706 that requires replacement of the entire image capture device 704.

The replaceable lens module 720 may also include a biasing element 742 coupled to the housing 722 and configured to bias the engaging surface 730 of the housing 722 against the mounting surface 718 of the lens barrel 706 (e.g., the mounting surface 718 of the bayonet 714). As shown in FIGS. 7A and 7B, the biasing element 742 may be positioned between the housing 722 and the body 708 of the image capture device 704. The biasing element 742 may be at least partially compressed within a cavity formed between the housing 722 and the body 708 so that the biasing element 742 may exert a biasing force on the housing 722 in a direction substantially parallel to the optical axis 712 and towards the mounting surface 718 of the lens barrel 706. The engaging surface 730 of the housing 722 may be configured to be substantially flush to the mounting surface 718 of the lens barrel 706 when the engaging surface 730 is biased against the mounting surface 718 by the biasing element 742. For example, the mounting surface 718 may be a notch or groove along the fingers 716 having a substantially planar surface that contacts a substantially planar surface of the engaging surface 730 of the first projection 728. The mounting surface 718 and the engaging surface 730 may also be similar to the mounting surface 618 and the engaging surface 630, respectively, of the image capture device 604.

The replaceable lens module 720 may also include a cap 744. The cap 744 may be similar to the cap 644 of the image capture device 604. The cap 744 may be configured to at least partially conceal and/or protect the housing 722 or the lens recess 726 of the replaceable lens module 720. The cap 744 may be removably coupled to the body 708 of the image capture device 704 when the replaceable lens module 720 is removably coupled to the lens barrel 706. The cap 744 may be coupled to the replaceable lens module 720 and free of coupling to the body 708. The cap 744 may be removably coupled to the replaceable lens module 720 to allow for removal and/or movement of the cap 744 independent of the replaceable lens module 720. For example, the cap 744 may be configured to rotate about the optical axis 712 independent of the replaceable lens module 720 to facilitate threading the cap 744 onto corresponding threading of the body 708.

A first seal 746 may be disposed between the housing 722 and the body 708 of the image capture device 704 and a second seal 748 may be disposed between separate portions of the body 708 to prevent moisture and/or debris from entering and potentially damaging the image capture device 704. The seals 746, 748 may be similar to the seals 646, 648 of the image capture device 604. For example, the seals 746, 748 may be compressible between components of the image capture device 704 to close off gaps between the components.

As discussed above, the housing 722 may be configured to move axially along the optical axis 712 to deflect an impact force away from the lens barrel 706. The housing 722 may be configured to move axially with respect to the lens barrel 706 between an engaged position, in which the housing 722 is biased against the lens barrel 706 (e.g., the housing 722 is biased against the lens barrel 706 by the biasing element 742, as shown in FIGS. 7A and 7B), to an impact position, in which the housing 722 is free of contact with the lens barrel 706.

By way of example, and as shown in FIG. 7B, the impact force may be applied to the replaceable lens module 720 in the direction 738. As a result of the impact force, the housing 722 and the external lens 724 may move in the direction 740 away from the mounting surface 718 of the bayonet 714. The housing 722 may also be configured to move independently of the external lens 724. Additionally, the housing 722 may be configured to move as a result of any impact force or the housing 722 may be configured to move when the impact force meets a predefined threshold. For example, the predefined threshold may be a minimum impact force that is sufficient to compress the biasing element 742 with the housing 722. The predefined threshold may be any desired threshold and is not limited to any particular force, as the threshold may be dependent on the structure of the biasing element 742 and/or the overall structure of the image capture device 704. For example, the predefined threshold to compress the biasing element 742 may be the same or different than the predefined threshold to compress the biasing element 642 of the image capture device 604.

When the housing 722 moves in the direction 740, the first projection 728 may separate from the fingers 716 of the bayonet 714 to disengage the housing 722 from the lens barrel 706. The housing 722 may continue to travel in the direction 740 until the second projection 734 of the housing 722 contacts the travel stop 736 of the body 708 of the image capture device 704. As shown in FIG. 7B, when the housing 722 is in the engaged position, a first gap 750 may exist between the second projection 734 and the travel stop 736 and a second gap 752 may exist between the first projection 728 and the body 708 of the image capture device 704. When the housing 722 moves in the direction 740 due to an impact force applied to the replaceable lens module 720, both the first gap 750 and the second gap 752 may decrease in height as measured substantially parallel to the optical axis 712 and indicated by the arrows and line therebetween shown in FIG. 7B. Additionally, the first gap 750 may have a height that is less than a height of the second gap 752 so that the second projection 734 of the housing 722 may contact the travel stop 736 prior to the first projection 728 contacting the body 708. As a result, the housing 722 may deflect the impact force through the second projection 734 of the housing 722 and into the body 708 of the image capture device 704.

Figure 8:
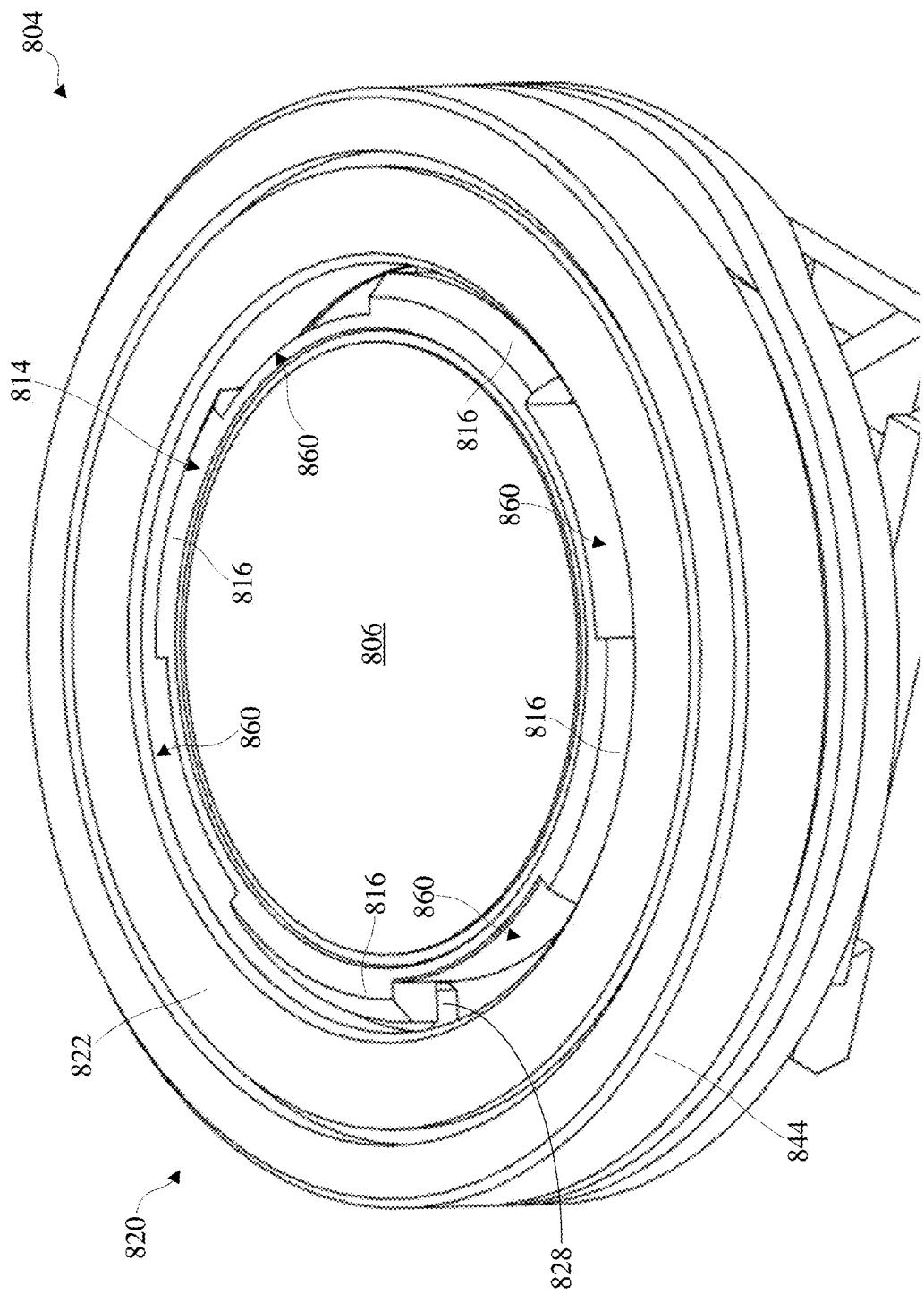
FIG. 8 is a partial isometric view of an image capture device.

FIG. 8 illustrates a partial isometric view of an image capture device 804. The image capture device 804 may be similar to the image capture devices 104, 204, 206, 304, 306, 404, 604, 704 described above. Portions of the image capture device 804 have been removed from the partial cross-sectional view for clarity and simplicity.

The image capture device 804 may include a lens barrel 806. The lens barrel 806 may include a bayonet 814 having a plurality of fingers 816 extending away from the lens barrel 806 in a direction substantially perpendicular to an optical axis of the lens barrel 806, which may be similar to the optical axes 612, 712 described above.

A replaceable lens module 820 may be configured to removably couple to the lens barrel 806. For example, a housing 822 of the replaceable lens module 820 may include projections 828 that are configured to engage the fingers 816 of the bayonet 814. The projections 828 may be similar to the projections 628, 728 discussed above. Additionally, the projections 828 may extend along all or a portion of the housing 822 to engaging the fingers 816. Moreover, the replaceable lens module 820 may include a cap 844 that may at least partially cover the housing 822. It should be noted that the replaceable lens module 820 may be similar to the replaceable lens modules 620, 720 described above.

The replaceable lens module 820 may be movable along and about the optical axis of the lens barrel 806 to couple the replaceable lens module 820 to the bayonet 814. For example, a user may initially align the projections 828 with spaces 860 located between the fingers 816 of the bayonet 814. Once the projections 828 are aligned with the spaces 860, the replaceable lens module 820 may be moved towards the lens barrel 806 along the optical axis of the lens barrel 806 until the projections 828 are positioned internal of the fingers 816, at which point the replaceable lens module 820 may be rotated about the optical axis until the projections 828 align with the fingers 816.

Once the projections 828 are aligned beneath or below the fingers 816 as shown in FIG. 8, the replaceable lens module 820 is removably coupled to the lens barrel 806. Additionally, the image capture device 804 may also include a biasing element similar to the biasing elements 642, 742 described above. The biasing element may be configured to bias the projections 828 towards the fingers 816 to maintain engagement between the replaceable lens module 820 and the bayonet 814, thereby maintaining alignment of an external lens of the replaceable lens module 820 (e.g., similar to the external lenses 624, 724 described above) with the lens barrel 806. The replaceable lens module 820 may maintain engagement to the lens barrel 806 yet also be configured to move with respect to the lens barrel 806 as described above to ensure that an impact force may be deflected away from the lens barrel 806 to prevent damage to the lens barrel 806.

Figure 9:
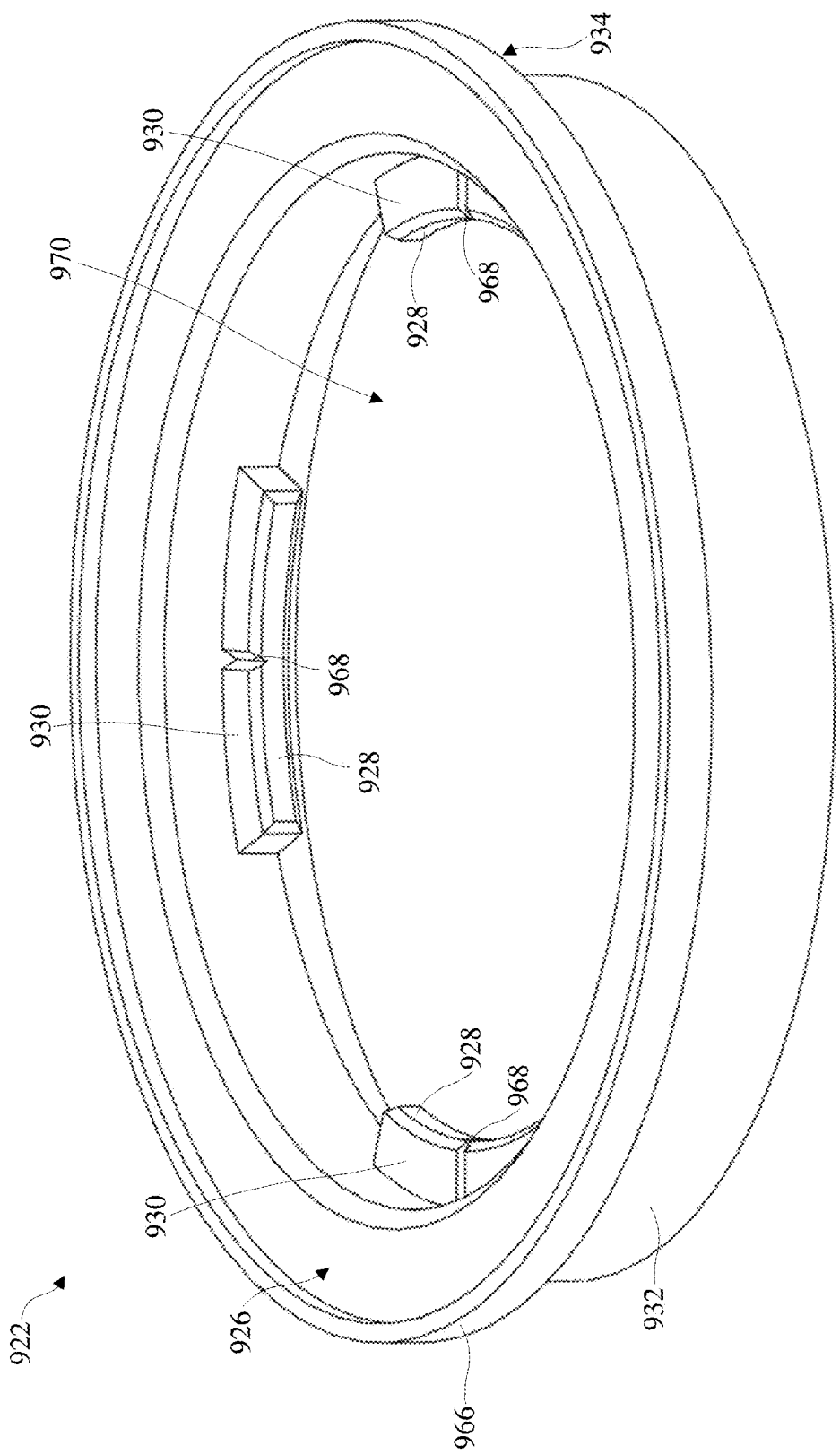
FIG. 9 is an isometric view of a housing of a replaceable lens module.

FIG. 9 illustrates an isometric view of a housing 922 of a replaceable lens module. The housing 922 may be similar to the housings 622, 722, 822 described above.

The housing 922 may include a lens recess 926 that may be configured to receive an external lens of the replaceable lens module, such as the external lenses 624, 724. The housing 922 may also include a set of first projections 928 that each include an engaging surface 930 configured to couple the housing 922 to a lens barrel similar to the lens barrel 606, 706, 806 described above. The first projections 928 may extend from an axial portion 932 of the housing 922. Additionally, a second projection 934 of the housing 922 may extend generally continuously around the axial portion 932 and may be configured to axially align with the lens barrel of an image capture device.

The second projection 934 may extend away from the axial portion 932 and may be adjacent to, or may include, the lens recess 926. For example, the lens recess 926 may be a surface of the second projection 934 that may be configured to receive the external lens of the replaceable lens module. Additionally, the second projection 934 may include a lip 966 extending substantially perpendicular to the second projection 934 to position and/or secure a position of the external lens relative to the lens recess 926.

As discussed above, the first projections 928 may be configured to removably couple the housing 922 to a lens barrel. The first projections 928 may be configured to maintain a position of the housing 922 relative to the lens barrel both axially and rotationally with respect to the optical axis of the lens barrel. As discussed below with respect to FIG. 10, the first projections 928 may include a notch 968 that is configured to engage a tooth of the lens barrel. As a result, rotation of the housing 922 with respect to the lens barrel may be prevented, thereby further maintaining a position of the housing 922 and ensuring proper alignment between the replaceable lens module and the lens barrel.

Figure 10:
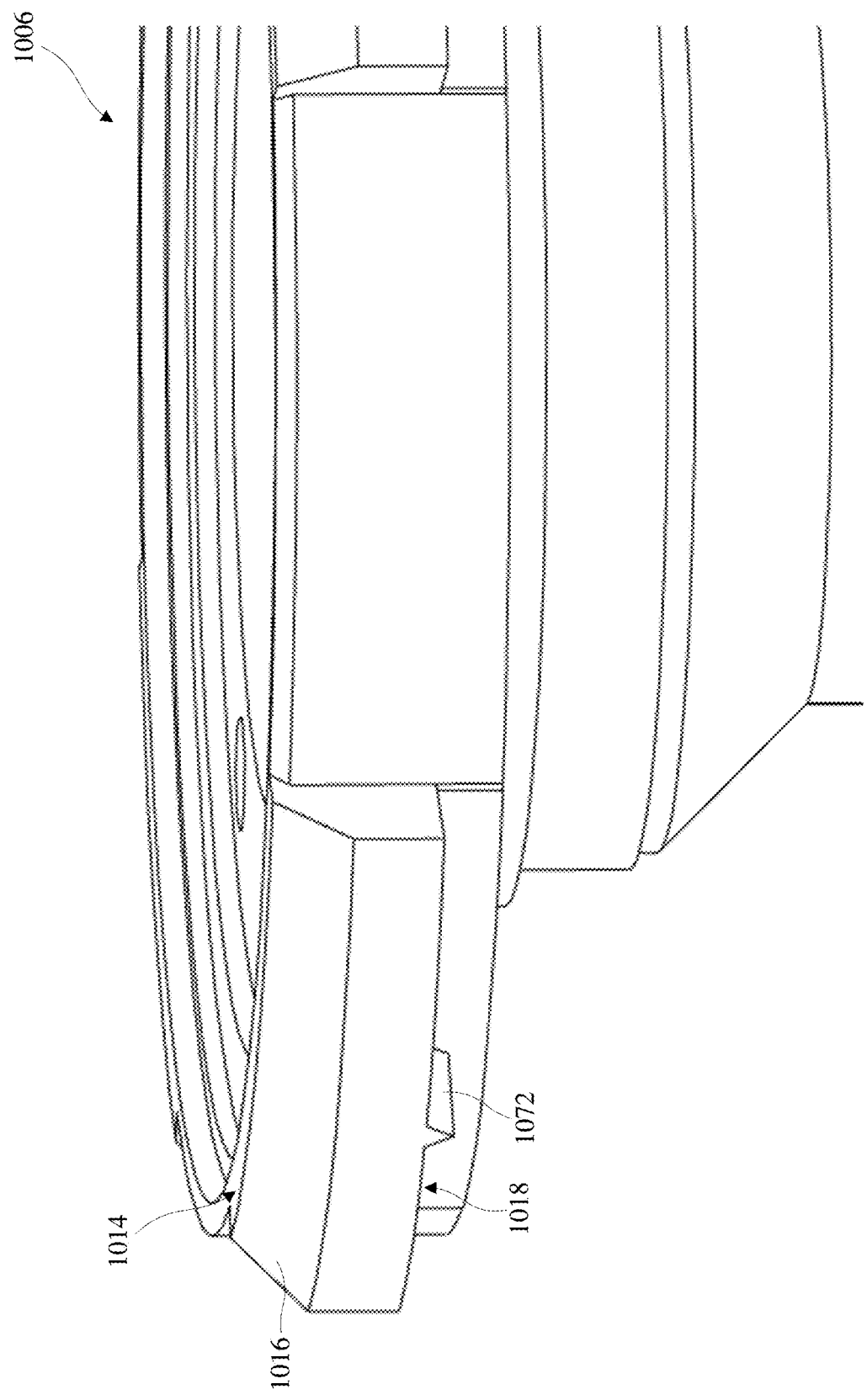
FIG. 10 is a partial isometric view of a lens barrel.

FIG. 10 illustrates a partial isometric view of a lens barrel 1006. The lens barrel 1006 may be similar to the lens barrels 606, 706, 806 discussed above. Additionally, the lens barrel 1006 may be configured to removably couple to the housing 922—or a replaceable lens module that includes the housing 922—as described above.

The lens barrel 1006 may include a bayonet 1014 having one or more fingers 1016. The fingers 1016 may include a mounting surface 1018 that is configured to engage the engaging surface 930 of the projections 928 of FIG. 9. The mounting surface 1018 may also include a tooth 1072 extending in a direction toward the projections 928 when the housing 1022 is coupled to the lens barrel 1006. The tooth 1072 may be complementary in shape or otherwise engage the notch 968 of the projections 928 so that the housing 922 may be prevented from rotating with respect to the lens barrel 1006, thereby maintaining a position of the housing 922 with respect to the lens barrel 1006. The tooth 1072 may also be any size and/or shape to engage the housing 922. A single tooth 1072 or more than one tooth 1072 may be disposed on each of the fingers 1016. Additionally, the fingers 1016 may include an abrasive surface or friction modifier along the mounting surface 1018 that may also maintain position of the housing 922 with respect to the lens barrel 1006. Therefore, the replaceable lens module that includes the housing 922 may facilitate quick connection and disconnection with respect to the lens barrel 1006 while also ensuring proper engagement between the housing 922 and the lens barrel 1006 for operation of the image capture device.

The methods and techniques of the replaceable lens module and the image capture device described herein, or aspects thereof, may be implemented by an image capture apparatus, or one or more components thereof, such as the image capture apparatus 100 shown in FIGS. 1A-1B, the image capture apparatus 200 shown in FIGS. 2A-2B, the image capture apparatus 300 shown in FIG. 3, the image capture apparatus 400 shown in FIGS. 4A-4B, or the image capture apparatus 500 shown in FIG. 5. The methods and techniques of the replaceable lens module and the image capture device described herein, or aspects thereof, may be implemented by an image capture device, such as the image capture device 104 shown in FIGS. 1A-1B, one or more of the image capture devices 204, 206 shown in FIGS. 2A-2B, one or more of the image capture devices 304, 306 shown in FIG. 3, the image capture device 404 shown in FIGS. 4A-4B, or an image capture device of the image capture apparatus 500 shown in FIG. 5.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device, comprising:
    a lens barrel disposed in a body of the image capture device;
    a bayonet;
    a replaceable lens module configured to releasably couple to the bayonet and that includes:
        a housing; and
        a lens positioned in a lens recess of the housing; and
    a biasing element coupled to the housing or coupled to the bayonet that is configured to bias the housing against the lens barrel,
    wherein when an impact force that meets a predetermined threshold is applied to an exterior surface of the replaceable lens module, the housing is configured to compress the biasing element and disengage the lens barrel such that the replaceable lens module moves towards the body of the image capture device until the housing contacts a travel stop located on the body of the image capture device.

2. The image capture device of claim 1, wherein when the impact force that meets the predetermined threshold is applied to the exterior surface of the replaceable lens module, the housing is configured to move outward and inward with respect to the body of the image capture device in a direction substantially parallel to an optical axis of the lens barrel.

3. The image capture device of claim 1, wherein the housing includes:
    an axial portion that extends substantially parallel to an optical axis of the lens barrel; and
    a projection that extends radially inward from the axial portion towards the optical axis to releasably couple the replaceable lens module to the bayonet.

4. The image capture device of claim 3, wherein the bayonet is coupled to the lens barrel and includes a finger that extend radially outward from the optical axis, and wherein the projection of the housing is configured to engage the finger of the bayonet.

5. The image capture device of claim 4, wherein the projection and the finger of the bayonet are complementary in shape.

6. The image capture device of claim 4, wherein the biasing element is configured to exert a biasing force on the housing to retain contact between an engaging surface of the projection and a mounting surface of the finger of the bayonet.

7. The image capture device of claim 1, wherein the biasing element is located between the housing and the body.

8. The image capture device of claim 1, wherein the replaceable lens module further comprises:
    a cap coupled to the housing and configured to couple to the body of the image capture device.

9. The image capture device of claim 1, wherein the replaceable lens module is movable along and about an optical axis of the lens barrel to couple the replaceable lens module to the bayonet.

10. The image capture device of claim 1, wherein the replaceable lens module is configured to axially align the lens of the replaceable lens module and the lens barrel of the image capture device.

11. The image capture device of claim 2, wherein the biasing element is configured to exert a biasing force on the housing in a direction opposite to a direction of movement of the housing.

12. A replaceable lens module for an image capture device, the replaceable lens module comprising:
a housing configured to removably couple the replaceable lens module to a bayonet of the image capture device;
a lens disposed in a lens recess of the housing, wherein the lens is configured to axially align with a lens barrel disposed in a body of the image capture device; and
a biasing element coupled to the housing and configured to bias an engaging surface of the housing against a mounting surface of the lens barrel outward along an optical axis of the image capture device toward the lens,
wherein when an external force that meets a predetermined threshold is applied to the replaceable lens module, the engaging surface of the housing is configured to separate from the mounting surface of the lens barrel so that the housing is free of contact with the lens barrel and the external force is transmitted through the housing and away from the lens barrel.

13. The replaceable lens module of claim 12, wherein the housing includes:
an axial portion that extends substantially parallel to an optical axis of the lens barrel; and
a first projection that extends radially inward from the axial portion towards the optical axis, wherein the engaging surface of the housing is located on the first projection.

14. The replaceable lens module of claim 13, wherein the housing further includes:
a second projection that extends radially outward from the axial portion away from the optical axis, wherein the second projection is configured to contact the body of the image capture device when the engaging surface of the housing separates from the mounting surface of the lens barrel to transmit the external force through the housing and away from the lens barrel.

15. The replaceable lens module of claim 14, wherein the first projection is configured to be free of contact with both the lens barrel and the body of the image capture device when the second projection contacts the body of the image capture device.

16. The replaceable lens module of claim 12, wherein the housing is configured to move outward and inward with respect to the image capture device in a direction substantially parallel to an optical axis of the lens barrel to separate the engaging surface of the housing from the mounting surface of the lens barrel.

17. The replaceable lens module of claim 12, wherein the engaging surface of the housing is configured to be substantially flush to the mounting surface of the lens barrel when the engaging surface is biased against the mounting surface.

18. An image capture device, comprising:
a lens barrel disposed in a body of the image capture device and that includes one or more internal lenses disposed in the lens barrel;
a bayonet coupled to the lens barrel or coupled to the body of the image capture device;
a replaceable lens module configured to move axially with respect to the lens barrel and that includes:
a housing configured to move axially with respect to the lens barrel between an engaged position, in which the housing is biased against the lens barrel, and an impact position, in which the housing is free of contact with the lens barrel; and
a lens coupled to the housing and configured to axially align with the one or more internal lenses; and
a first seal compressible between the housing and the body of the image capture device to prevent moisture from penetrating a space between the body and the housing.

19. The image capture device of claim 18, wherein the replaceable lens module further includes:
a cap coupled to the housing and configured to at least partially conceal the housing from view from a position exterior to the image capture device, wherein the cap is configured to couple to the body of the image capture device.

20. The image capture device of claim 19, further comprising:
a second seal compressible between the cap and the body of the image capture device.

* * * * *